(12) United States Patent
Nakamura et al.

(10) Patent No.: US 7,729,031 B2
(45) Date of Patent: Jun. 1, 2010

(54) LIGHT-SOURCE DEVICE, OPTICAL SCANNING DEVICE, AND IMAGE FORMING APPARATUS

(75) Inventors: Tadashi Nakamura, Kanagawa (JP); Yoshinori Hayashi, Kanagawa (JP); Naoki Miyatake, Kanagawa (JP); Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 230 days.

(21) Appl. No.: 11/851,307

(22) Filed: Sep. 6, 2007

(65) Prior Publication Data
US 2008/0062491 A1     Mar. 13, 2008

(30) Foreign Application Priority Data

| Sep. 7, 2006 | (JP) | ............................ 2006-242720 |
| Sep. 19, 2006 | (JP) | ............................ 2006-253579 |
| Jun. 29, 2007 | (JP) | ............................ 2007-172230 |

(51) Int. Cl.
G02B 26/08 (2006.01)
(52) U.S. Cl. .................................................. 359/212.1
(58) Field of Classification Search .... 359/212.1–215.1
See application file for complete search history.

(56) References Cited

U.S. PATENT DOCUMENTS

| 6,757,089 | B2 | 6/2004 | Hayashi |
| 6,977,762 | B2 | 12/2005 | Hayashi |
| 7,106,483 | B2 | 9/2006 | Hayashi et al. |
| 7,145,705 | B2 | 12/2006 | Hayashi |
| 7,161,724 | B1 | 1/2007 | Miyatake |
| 7,164,516 | B2 | 1/2007 | Hayashi et al. |
| 7,218,432 | B2 | 5/2007 | Ichii et al. |
| 2004/0169905 | A1 | 9/2004 | Hayashi et al. |
| 2004/0240000 | A1 | 12/2004 | Miyatake et al. |
| 2005/0094234 | A1 | 5/2005 | Miyatake et al. |
| 2005/0269496 | A1 | 12/2005 | Hayashi |
| 2006/0000990 | A1 | 1/2006 | Hayashi et al. |
| 2006/0077500 | A1 | 4/2006 | Hayashi et al. |
| 2006/0203264 | A1 | 9/2006 | Miyatake |
| 2006/0232659 | A1 | 10/2006 | Hayashi et al. |
| 2006/0284968 | A1 | 12/2006 | Hayashi et al. |
| 2007/0081216 | A1* | 4/2007 | Miyatake .................... 359/204 |
| 2007/0081217 | A1 | 4/2007 | Hayashi et al. |
| 2007/0146849 | A1 | 6/2007 | Miyatake et al. |

FOREIGN PATENT DOCUMENTS

| JP | 2924200 | 5/1999 |
| JP | 3011144 | 12/1999 |
| JP | 2002-82303 | 3/2002 |
| JP | 3445691 | 6/2003 |
| JP | 3543473 | 4/2004 |
| JP | 2004-279947 | 10/2004 |

* cited by examiner

*Primary Examiner*—Euncha P Cherry
(74) *Attorney, Agent, or Firm*—Dickstein Shapiro LLP

(57) ABSTRACT

A line-imaging lens condenses a light beam from a light-source unit in one direction to form a line image. An optical deflecting unit deflects the light beam passing through the line-imaging lens. An imaging optical unit images the light beam deflected by the optical deflecting unit in a spot shape on a scanning surface to be scanned. An adjusting unit adjusts a position of irradiation of the light beam from the light-source unit on the optical deflecting unit.

19 Claims, 30 Drawing Sheets

LIGHT-SOURCE DEVICE, OPTICAL SCANNING DEVICE, AND IMAGE FORMING APPARATUS

CROSS-REFERENCE TO RELATED APPLICATIONS

The present application claims priority to and incorporates by reference the entire contents of Japanese priority document, 2006-242720 filed in Japan on Sep. 7, 2006, 2006-253579 filed in Japan on Sep. 19, 2006 and 2007-172230 filed in Japan on Jun. 29, 2007.

BACKGROUND OF THE INVENTION

1. Field of the Invention

The present invention relates to a light-source device and optical scanning device having a light-source angle adjusting function and for use in an image forming apparatus, such as a digital copier, facsimile, or laser printer, and also relates to an image forming apparatus having incorporated therein the light-source device or optical scanning device.

2. Description of the Related Art

An image forming apparatus, such as a digital copier, facsimile, and laser printer, is provided with various optical scanning devices for scanning a photosensitive member with a light beam. In the optical scanning devices that have been conventionally used, a polygon mirror or galvanometer mirror has been used as a deflector that deflects a light beam from a light source. However, to form an image with higher resolution within a short time, such a polygon mirror or galvanometer mirror has to be rotated at higher speed. Rotation of the polygon mirror or galvanometer mirror with high speed has a limitation due to durability of a bearing rotatably supporting the polygon mirror or galvanometer mirror explained above, heating at the time of rotation, noise, and other factors.

To get around this problem, for use as deflectors in the optical scanning device, deflectors using silicon micromachining have been suggested in recent years in, for example, Japanese Patent No. 2924200, Japanese Patent No. 3011144, Japanese Patent Application Laid-Open Publication No. 2002-82303, Japanese Patent No. 3445691, and Japanese Patent No. 3543473. In a deflector 501 of this type, as depicted in FIG. 54, a vibrating mirror 502 with its surface serving as a deflector plane 502a and a torsional bar 503 pivotally supporting the vibrating mirror 502 are integrally formed in the deflector 501. With the deflector 501, the vibrating mirror 502 can be downsized, thereby downsizing the deflector itself. In addition, since the vibrating mirror 502 is vibrated in a reciprocating manner by using the resonance of the vibrating mirror 502, a high-speed operation can be advantageously performed with low noise and power consumption.

Furthermore, with low vibration and little heating, the housing that accommodates the optical scanning device and others can be made thinner. Therefore, even if the housing is configured of a low-cost resin molding material with a small ratio of mixture of glass fiber, it is an advantage that an influence on image quality hardly occurs. In particular, Japanese Patent Application Laid-Open Publication No. 2002-82303 discloses an example in which the deflector 501 explained above is used in place of a polygon mirror. Also, Japanese Patent No. 3445691 and Japanese Patent No. 3543473 disclose image forming apparatuses in which a vibrating mirror is used in place of a polygon mirror to achieve low noise and power consumption, which is suitable for office environment and also earth environment.

However, when the vibrating mirror 502 explained above is driven, a deformation in active plane occurs as explained below, due to the moment of inertia and resilience of the vibrating mirror 502.

When the dimension of the vibrating mirror 502 depicted in FIG. 54 is such that its length is 2a, its width is 2b, and its thickness is d, the length of the torsional bar 503 is L and its width is c, the density of Si is $\rho$, and the material constant is G, a moment of inertia I of the vibrating mirror 502 is represented by Equation (1).

$$I=(4ab\rho d/3) \times a2 \qquad (1)$$

As represented in Equation (1) above, the local moment of inertial I of the vibrating mirror 502 is a function of a distance from a rotational axis of the vibrating mirror 502, and it can be found that, as the distance from the rotational axis is increased, the moment of inertia is increased. Furthermore, since the thickness of the vibrating mirror 502 itself is as thin as several hundred micrometers, with a change in rotation speed associated with the reciprocating movement and an inertial force on the vibrating mirror 502, forces in opposite directions are exerted at a position near the torsional bar 503 of the vibrating mirror 502 and an end away from the torsional bar 503, thereby causing, as depicted in FIG. 55, the vibrating mirror 502 to be deformed to become wavy. Therefore, wave aberration of a bundle of light beams reflected by the vibrating mirror 502 is increased, thereby making the optical beam thick.

FIG. 55 depicts a deformed state of the vibrating mirror 502 with a simple plate shape. In FIG. 55, a deterioration in wave aberration of light beams and also a shift in an incident position in a direction orthogonal to the torsional bar 503 (a main scanning direction) as represented by a broken line occur at the same time. In this case, since an apparent curvature differs, a shift (shift in focus) occurs in an image-forming position of the light beams. In particular, as depicted in FIGS. 56 and 57, when the light beams converge on an edge of the vibrating mirror 502 due to assembling error of the deflector, the light source, and other components, the light beams may become thick (see FIG. 57), or a shift in focus may occurs (see FIG. 56).

Also, the light beams converging on the edge of the vibrating mirror 502 become a light-gathered bundle in the main scanning direction (see FIG. 56) or a diffused light bundle (see FIG. 57), and therefore the light beams cannot be uniformly gathered at the image-forming position. For this reason, a desired beam spot size cannot be achieved. Therefore, in conventional examples, light beams cannot be gathered over the entire scanned plane, thereby making it impossible to uniformly keep the beam spot size and, as a result, disadvantageously leading to image deterioration.

Moreover, as for the resonant frequency, there is a problem in which a change in spring constant of the torsional bar due to temperature or a change in viscosity resistance of air due to atmospheric pressure may change a deflection angle.

To get around this problem, as disclosed in Japanese Patent Application Laid-Open Publication No. 2004-279947, one suggested control is such that the deflection angle is detected by detecting a beam for use in scanning, thereby adjusting a current applied to the vibrating mirror 502 and stably keeping the deflection angle.

However, as a method of reducing deformation of the vibrating mirror 502, if the flexural rigidity of the board of the vibrating mirror 502 is increased, that is, if the thickness of the board of the vibrating mirror 502 is increased, the mass of the vibrating mirror 502 is also increased. Therefore, with comparison in the deflection angle of the vibrating mirror 502 with the same scanning frequency, the deflection angle of the vibrating mirror 502 with an increased thickness is disadvantageously decreased. For this reason, simply increasing the thickness cannot solve the problem.

SUMMARY OF THE INVENTION

It is an object of the present invention to at least partially solve the problems in the conventional technology.

An optical scanning device according to one aspect of the present invention includes a light-source unit that emits a light beam; a line-imaging lens that condenses the light beam from the light-source unit in one direction to form a line image; an optical deflecting unit that deflects the light beam passing through the line-imaging lens; an imaging optical unit that images the light beam deflected by the optical deflecting unit in a spot shape on a scanning surface to be scanned; and an adjusting unit that adjusts a position of irradiation of the light beam from the light-source unit on the optical deflecting unit.

A light-source device according to another aspect of the present invention includes a light-source unit that emits a light beam; a lens that condenses the light beam from the light-source unit in a predetermined condensing state; a holding member that integrally holds the light-source unit and the lens; a light-source supporting member abutting on a plane orthogonal to an optical axis of the light-source unit at the holding member and supporting the holding member; and a light-source angle adjusting member that adjusts an angle of the plane.

An optical scanning device according to still another aspect of the present invention includes a light-source unit that emits a light beam; an optical deflecting unit that is supported by a torsional bar, and deflects the light beam from the light-source unit to scan a main scanning area in a reciprocating manner; an imaging optical unit that images the light beam scanned by the optical deflecting unit in a spot shape on a scanning surface to be scanned; and a beam-incident-position adjusting unit that adjusts an incident position of the optical beam with respect to the optical deflecting unit in such a manner that spot sizes of the optical beams at respective ends of the main scanning area substantially coincide with each other.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
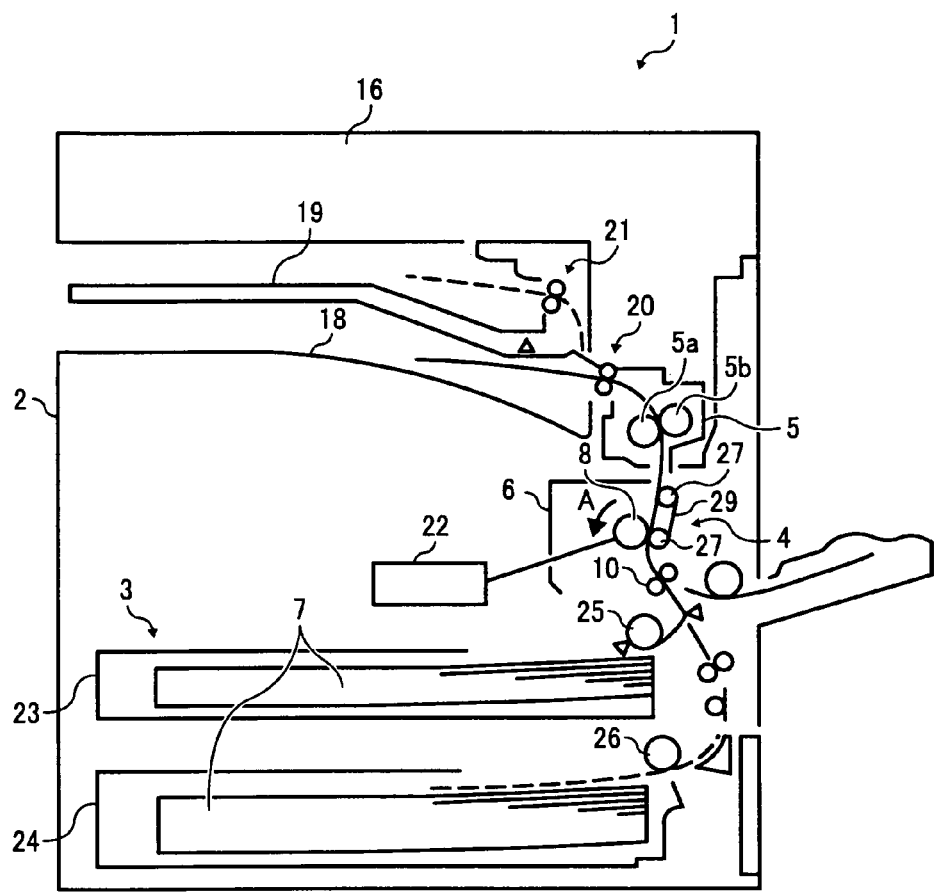
FIG. 1 is a drawing for explaining the configuration of an image forming apparatus according to a first embodiment when viewed from front side.
Figure 2:
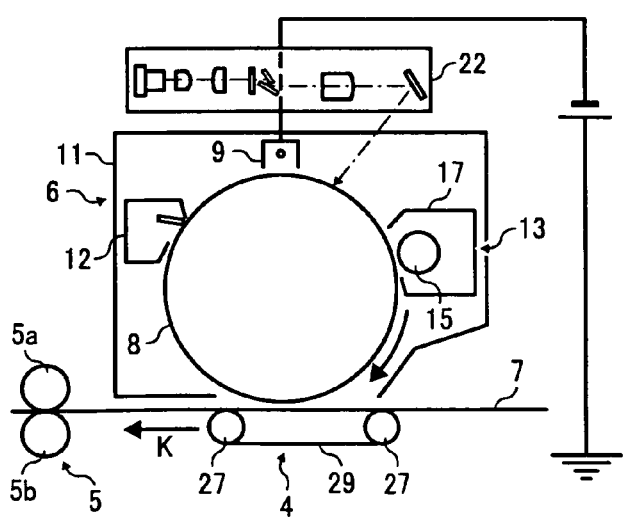
FIG. 2 is a drawing for explaining main portions, such as a laser writing unit as an optical scanning device and photosensitive members, of the image forming apparatus depicted in FIG. 1.
Figure 3:
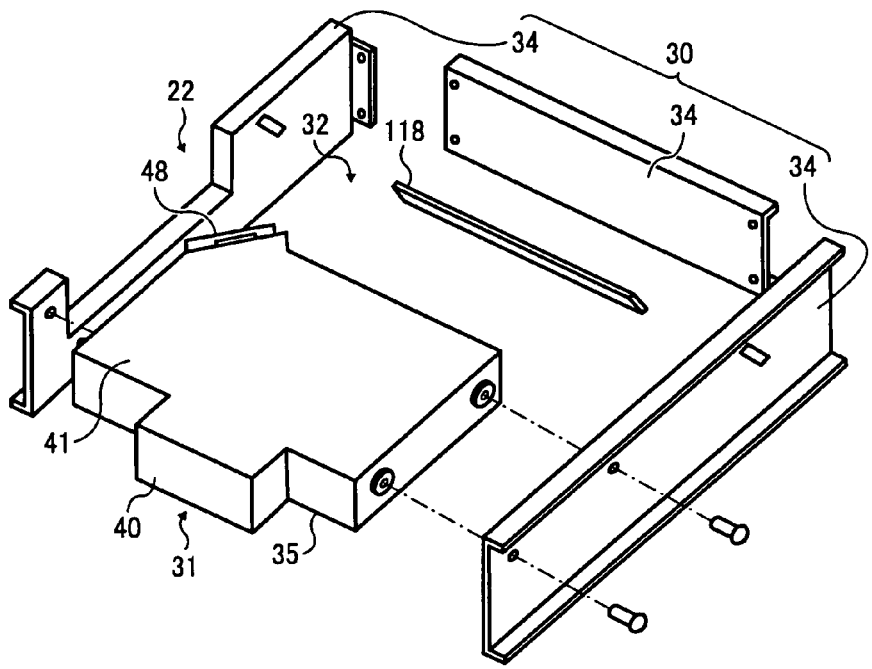
FIG. 3 is an exploded perspective view of the laser writing unit in the image forming apparatus depicted in FIG. 1.
Figure 4:
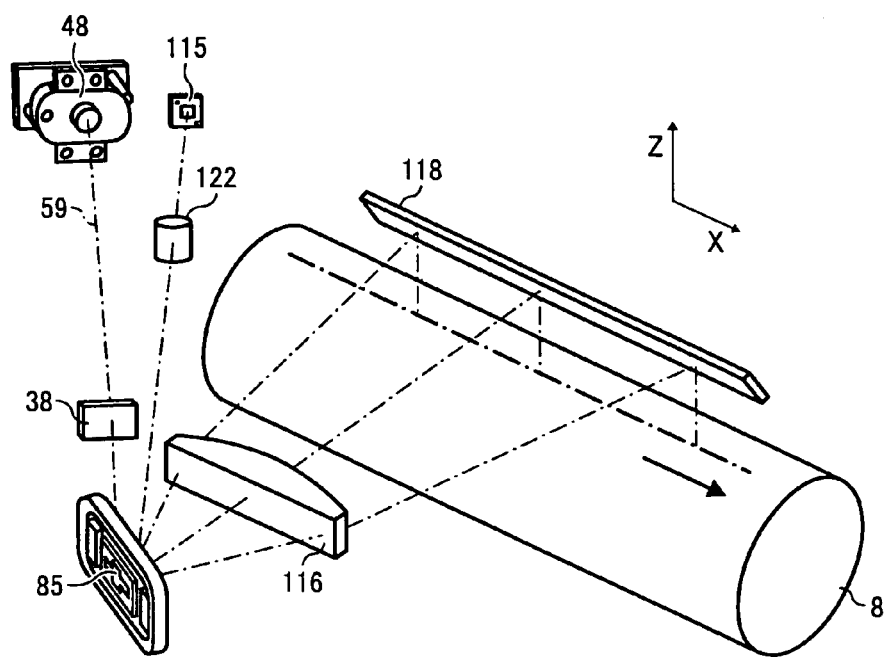
FIG. 4 is a perspective view of the main portions, such as the laser writing unit and the photosensitive members, of the image forming apparatus depicted in FIG. 1.
Figure 5:
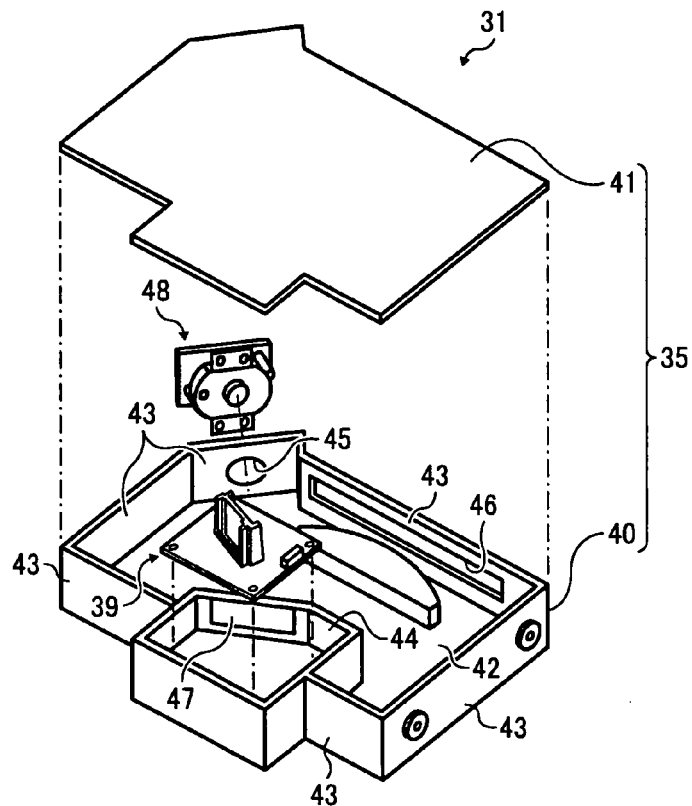
FIG. 5 is an exploded perspective view of a light-source device in the laser writing unit depicted in FIG. 3.
Figure 6:
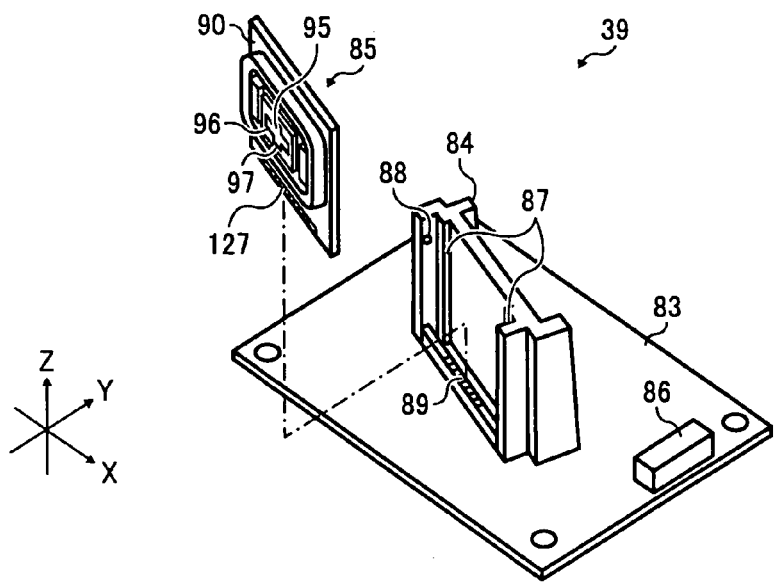
FIG. 6 is an exploded perspective view of a deflecting unit in the light-source device depicted in FIG. 4.
Figure 7:
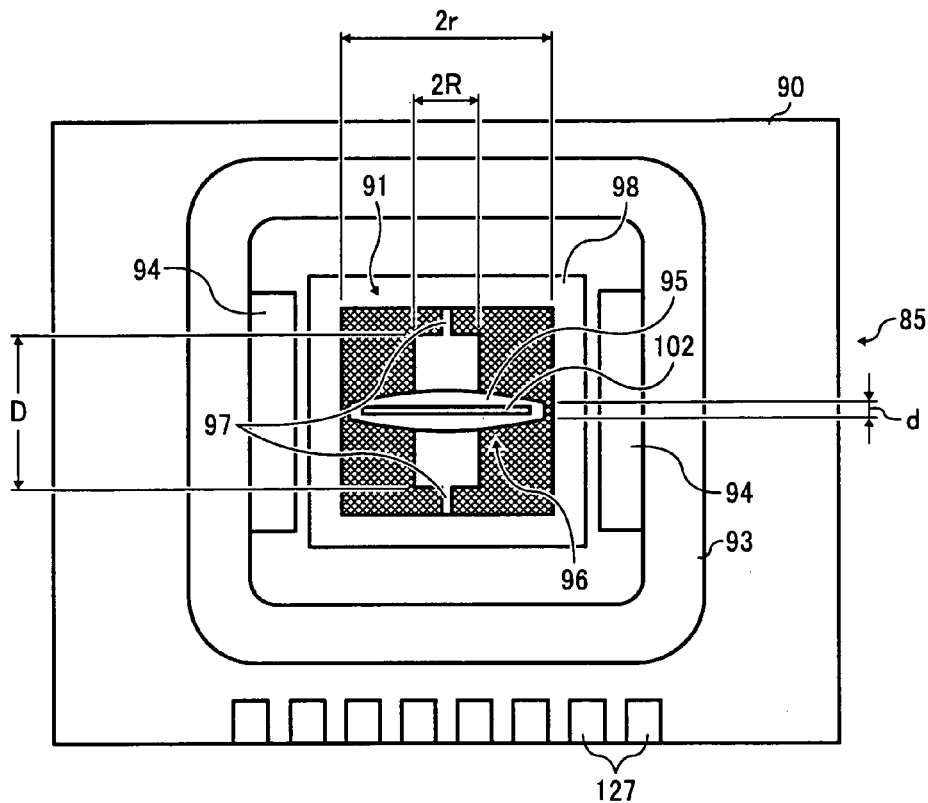
FIG. 7 is a front view of a vibrating mirror of the deflecting unit depicted in FIG. 6.
Figure 8:
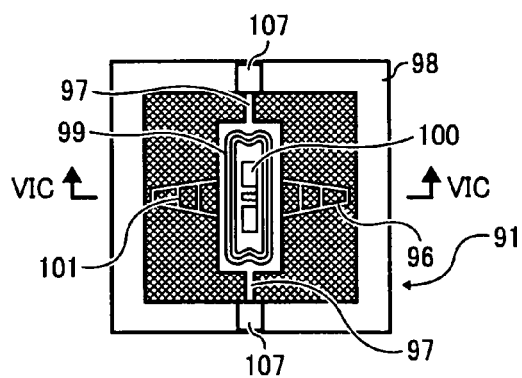
FIG. 8 is a rear view of a mirror unit of the vibrating mirror depicted in FIG. 7.
Figure 9:
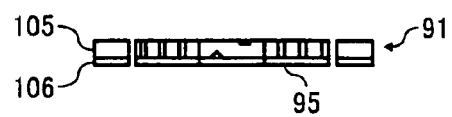
FIG. 9 is a cross-section view along a VIC-VIC line in FIG. 8.
Figure 10:
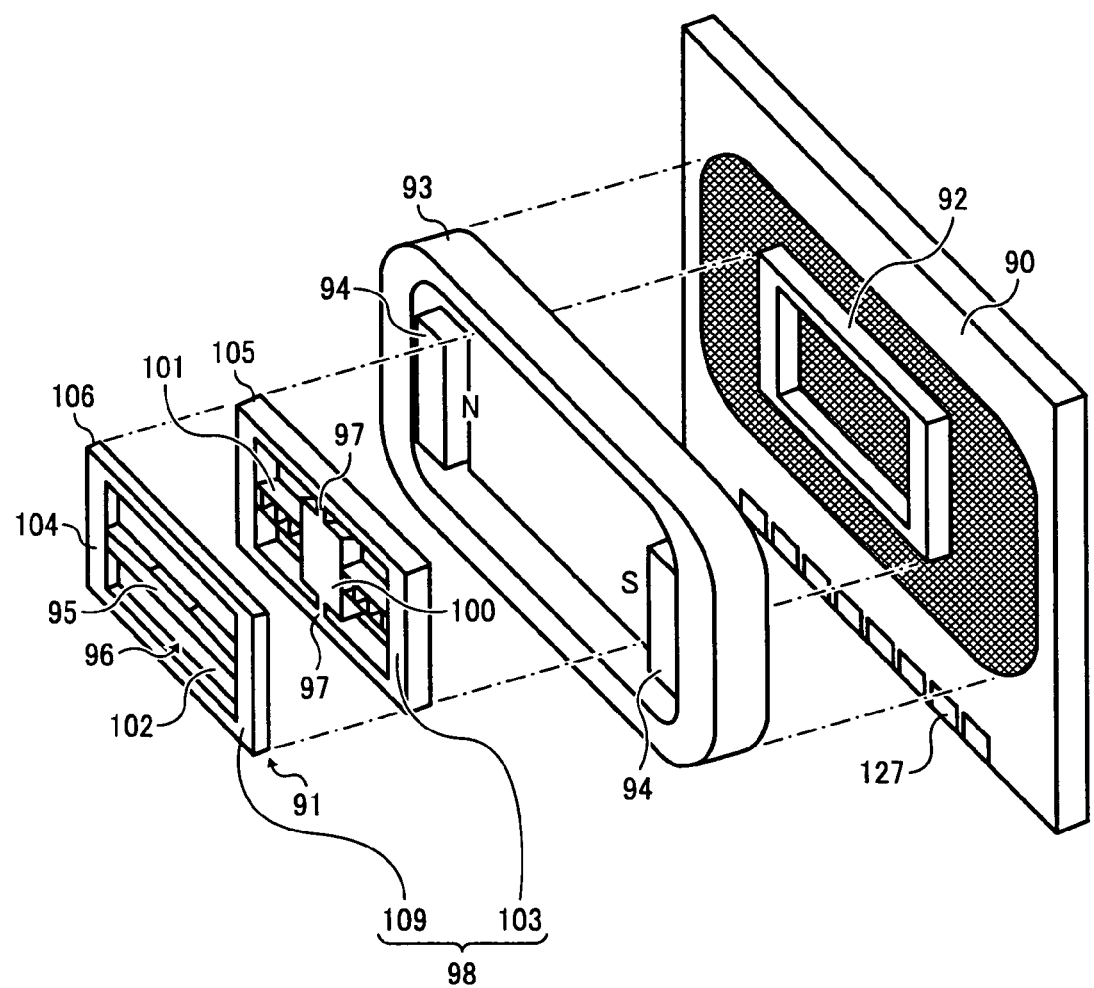
FIG. 10 is an exploded perspective view of the vibrating mirror depicted in FIG. 7.
Figure 11:
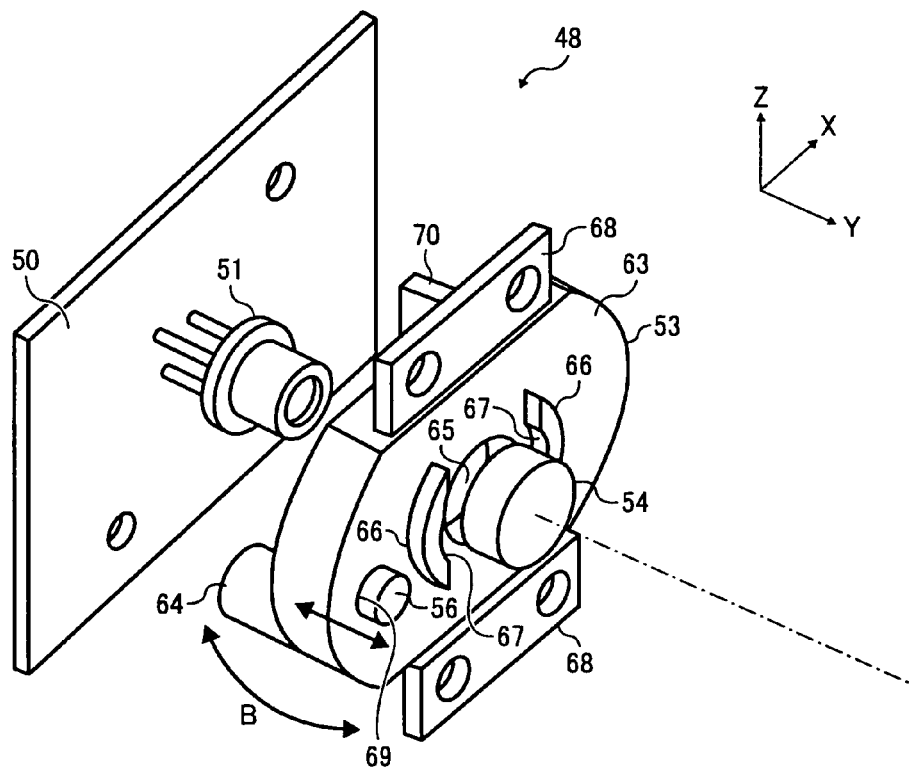
FIG. 11 is an exploded perspective view of a light-source unit of the light-source device depicted in FIG. 5.
Figure 12:
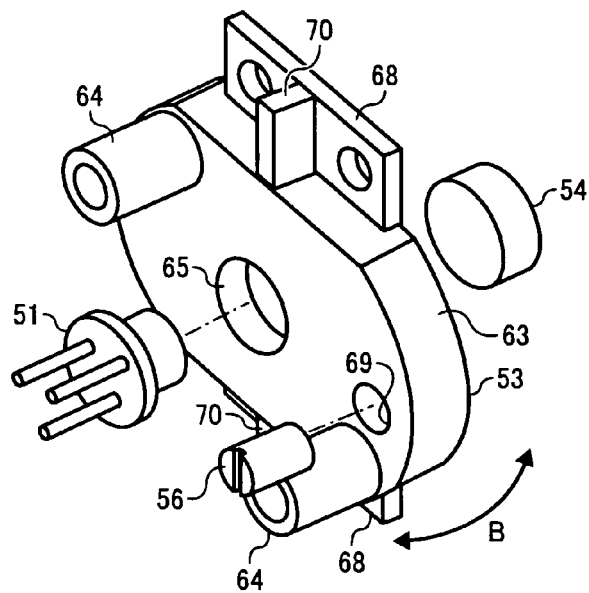
FIG. 12 is a perspective view of the light-source unit depicted in FIG. 11 when viewed from a rear side.

A first embodiment of the present invention is explained with reference to FIGS. 1 to 12 below. FIG. 1 is drawing for explaining the configuration of an image forming apparatus according to a first embodiment when viewed from front side. FIG. 2 is a drawing for explaining main portions, such as a laser writing unit as an optical scanning device and photosensitive members, of the image forming apparatus depicted in FIG. 1. FIG. 3 is an exploded perspective view of the laser writing unit in the image forming apparatus depicted in FIG. 1. FIG. 4 is a perspective view of the main portions, such as the laser writing unit and the photosensitive members, of the image forming apparatus depicted in FIG. 1. FIG. 5 is an exploded perspective view of a light-source device in the laser writing unit depicted in FIG. 3. FIG. 6 is an exploded perspective view of a deflecting unit 39 in the light-source device depicted in FIG. 4. FIG. 7 is a front view of a vibrating mirror of the deflecting unit 39 depicted in FIG. 6. FIG. 8 is a rear view of a mirror unit of the vibrating mirror depicted in FIG. 7. FIG. 9 is a cross-section view along a VIC-VIC line in FIG. 8. FIG. 10 is an exploded perspective view of the vibrating mirror depicted in FIG. 7. FIG. 11 is an exploded perspective view of a light-source unit of the light-source device depicted in FIG. 5. FIG. 12 is a perspective view of the light-source unit depicted in FIG. 11 when viewed from a rear side.

An image forming apparatus 1 forms an image on a recording sheet 7 (depicted in FIG. 1) as a transfer material. The image forming apparatus 1 at least includes, as depicted in FIG. 1, a main body 2, a paper-feeding unit 3, a pair of register rollers 10, a transferring unit 4, a fixing unit 5, a laser writing unit 22 as an optical scanning device, a process cartridge 6, and a paper-delivering unit 16.

The main body 2 is formed in a box shape, for example, and is placed on a floor or the like. The main body 2 has accommodated therein the paper-feeding unit 3, the pair of register rollers 10, the transferring unit 4, the fixing unit 5, the laser writing unit 22, and the process cartridge 6.

The paper-feeding unit 3 is provided under the main body 2, and includes a plurality of paper-feeding cassettes 23 and 24 insertable to the main body 2. The paper-feeding cassettes 23 and 24 have accommodated and stacked thereon the recording sheets 7, and include paper-feeding rollers 25 and 26, respectively. The paper-feeding rollers 25 and 26 are pressed onto the recording sheets 7 on top in the paper-feeding cassettes 23 and 24, respectively. The paper-feeding rollers 25 and 26 send out the recording sheet 7 explained above on top to a gap between the paired rollers 10a and 10b of the pair of register rollers 10.

The pair of register rollers 10 are provided on a conveyance path of the recording sheet 7 conveyed from the paper-feeding unit 3 to the transferring unit 4, and include the paired rollers. The pair of register rollers 10 nip the recording sheet 7 between the paired rollers, and send out the nipped recording sheet 7 to a gap between the transferring unit 4 and the process cartridge 6 at a timing when a toner image can be superposed (at a timing of start of recording in a sub-scanning direction (vertical direction in FIG. 1)).

The transferring unit 4 is provided above the paper-feeding unit 3. The transferring unit 4 includes a plurality of rollers 27 and a transfer belt 29. The rollers 27 are each rotatable provided to the main body, and at least one of them is driven by a motor or the like as a driving source for rotation. The transfer belt 29 is formed in an endless ring shape, and is stretched over the rollers 27. Stretched over the rollers 27 explained above, the transfer belt 29 is positioned below and near the process cartridge 6. With at least one of the rollers 27 being driven by the motor or the like for rotation, the transfer belt 29 circulates (endlessly runs) around the rollers 27 explained above.

In the transferring unit 4, the recording sheet 7 sent from the paper-feeding unit 3 is pressed with the transfer belt 29 onto the external surface of a photosensitive drum 8 of the process cartridge 6, thereby causing the toner image on the photosensitive drum 8 to be transferred to the recording sheet 7. The transferring unit 4 then sends the recording sheet 7 with the toner image transferred thereon toward the fixing unit 5.

The fixing unit 5 includes paired rollers 5a and 5b nipping the recording sheet therebetween. The fixing unit 5 presses and heats the recording sheet 7 sent from the transferring unit 4 to a gap between the paired rollers 5a and 5b, thereby causing the toner image transferred from the photosensitive drum 8 onto the recording sheet 7 to be fixed onto the recording sheet 7.

The laser writing unit 22 is disposed above the main body 2, that is, above the paper-feeding unit 3. The laser writing unit 22 emits laser light onto the external surface of the photosensitive drum 8 uniformly charged by an charging unit 9, which will be explained further below, of the process cartridge 6, thereby forming an electrostatic latent image. The laser writing unit 22 records an image (forms an electrostatic latent image) on the external surface of each photosensitive drum 8 for every two lines with reciprocating scanning with one cycle of a vibrating mirror 85, which will be explained further below. The detailed configuration of the laser writing unit 22 will be explained further below.

The process cartridge 6 is provided between the transferring unit 4 and the laser writing unit 22, and is removably mounted on the main body 2. The process cartridge 6 includes, as depicted in FIG. 2, a cartridge case 11, the charging unit 9 as a charging device, the photosensitive drum 8 as a photosensitive member (which is also referred to as an image carrier), a cleaning case 12 as a cleaning device, and a developing device 13. Therefore, the image forming apparatus 1 at least includes the charging unit 9, the photosensitive drum 8, the cleaning case 12, and the developing device 13.

The cartridge case 11 can be removably mounted on the main body 2, and has accommodated therein the charging unit 9, the photosensitive drum 8, the cleaning case 12, and the developing device 13. The charging unit 9 uniformly charges the external surface of the photosensitive drum 8. The photosensitive drum 8 is disposed so as to be spaced apart from a developing roller 15, which will be explained further below, of the developing device 13. The photosensitive drum 8 is formed in a rotatable columnar or cylindrical shape centering on its axial center.

The photosensitive drum 8 has an electrostatic latent image formed on its external surface by the laser writing unit 22. The photosensitive drum 8 has the electrostatic latent image formed and carried on its external surface and, to the electrostatic latent image, toner is absorbed for development. Thus obtained toner image is transferred onto the recording sheet 7 positioned between the photosensitive drum 8 and the transfer belt 29. The external surface of the photosensitive drum 8 serves as a scanned plane recited in the present embodiments. The cleaning case 12 removes residual transfer toner left on the external surface of the photosensitive drum 8 after the toner image is transferred onto the recording sheet 7.

The developing device 13 at least includes a toner cartridge 17 and the developing roller 15 as a developer carrier. The developing device 13 sufficiently mixes the toner and others in the toner cartridge 17, and causes the mixed toner to be absorbed onto the external surface of the developing roller 15. In the developing device 13, the developing roller 15 rotates to cause the toner to be absorbed onto the photosensitive drum 8. In this manner, the developing device 13 causes the toner to be carried on the developing roller 15 and conveyed to the developing area to develop the electrostatic latent image on the photosensitive drum 8, thereby forming a toner image.

The developing roller 15 is disposed in parallel to and near the photosensitive drum 8. The space between the developing roller 15 and the photosensitive drum 8 forms a developing area in which the toner is absorbed onto the photosensitive drum 8 for developing an electrostatic latent image to obtain a toner image.

The paper-delivering unit 16 includes paper-delivery trays 18 and 19 provided on an upper surface of the main body 2 and a pair of paper-delivery rollers 20 and 21 provided for the paper-delivery trays 18 and 19, respectively. The pair of paper-delivery rollers 20 and 21 has supplied therebetween the recording sheet 7 with the toner image fixed thereonto, the recording sheet 7 being nipped between the paired rollers 5a and 5b of the fixing unit 5. The pair of paper-delivery rollers 20 and 21 cause the recording sheet 7 with the toner image fixed thereonto to be delivered onto the paper-delivery trays 18 and 19, respectively.

The image forming apparatus 1 configured in the manner explained above forms an image on the recording sheet 7 as explained in the following. First, in the image forming apparatus 1, the photosensitive drum 8 is rotated, and the charging unit 9 uniformly charges the external surface of the photosensitive drum 8. The external surface of the photosensitive drum 8 is then radiated with laser light, thereby forming an electrostatic latent image on the external surface of the photosensitive drum 8. Then, when the electrostatic latent image is positioned in the developing area, toner absorbed on the external surface of the developing roller 15 of the developing device 13 is absorbed on the external surface of the photosensitive drum 8 for development of the electrostatic latent image, thereby forming a toner image on the external surface of the photosensitive drum 8.

Then, in the image forming apparatus 1, the recording sheet 7 conveyed with the paper-feeding rollers 25 and 26 of the paper-feeding unit 3 and others is positioned between the photosensitive drum 8 of the process cartridge 6 and the transfer belt 29 of the transferring unit 4, thereby transferring the toner image formed on the external surface of the photosensitive drum 8 of the process cartridge 6 onto the recording sheet 7. In the image forming apparatus 1, the toner image is fixed onto the recording sheet 7 at the fixing unit 5, and the recording sheet 7 is delivered onto either one of the paper-delivery trays 18 and 19 of the paper-delivering unit 16. In this manner, the image forming apparatus 1 forms an image on the recording sheet 7.

The laser writing unit 22 (hereinafter simply referred to as a unit) is explained in detail below. As depicted in FIG. 2, the laser writing unit 22 that scans the photosensitive drum 8 is integrally configured, deflecting and guiding, with the vibrating mirror 85, a light beam from a semiconductor laser 51, which will be explained further below, to the photosensitive drum 8 along a moving direction K of the recording sheet 7 (represented by an arrow in FIG. 2), thereby simultaneously forming an electrostatic latent image. In the drawing, a direction parallel to an axial core of the photosensitive drum 8 is represented by an arrow X and is referred to as a main scanning direction, a direction parallel to an optical axis of the light beam deflected by the vibrating mirror 85, which will be explained further below, is represented by an arrow Y and is referred to as an optical axis direction, and a direction orthogonal to both of the main scanning direction X and the optical axis direction Y is represented by an arrow Z and is referred to as a sub-scanning direction.

The laser writing unit 22 includes, as depicted in FIGS. 3 and 4, a unit body 30, a light-source device 31, and an image-forming optical system 32. The unit body 30 includes, as depicted in FIG. 3, three metal-strip members 34 in a band plate shape. The metal-strip members 34 each have both ends fixed to those of others, thereby forming an inverted C shape in a plan view. In this state, the metal-strip members 34 are mounted on the main body 2.

The light-source device 31 includes, as depicted in FIGS. 3 and 4, an optical housing 35, a light-source unit 48, a cylinder lens 38 as a line-imaging lens, and the deflecting unit 39 (depicted in FIG. 5).

The optical housing 35 includes a housing case 40 and an upper cover 41 in a flat plate shape, each formed of synthetic resin. The housing case 40 integrally includes a bottom plate 42 in a flat plate shape, a plurality of side plates 43 protruding from external edges of the bottom plate 42, and a partition plate 44. Of three of the side plates 43 connecting each other, one is provided with a fitting hole 45 for mounting the light-source unit 48, which will be explained further below, whilst another one is provided with an emission window 46. The fitting hole 45 is formed in circle. The emission window 46 is formed in flat rectangle.

The partition plate 44 partitions a space in the housing case 40, that is, in the optical housing 35, into a space for accommodating the deflecting unit 39 and a space for accommodating components other than the deflecting unit 39. The partition plate 44 is provided with a rectangular transparent window 47. The upper cover 41 covers an upper opening formed by the edge of the side plates 43 of the housing case 40 on a side away from the bottom plate 42, and is mounted on the housing case 40 to seal the optical housing 35. In this manner, with the upper edge of the side plates 43 being sealed by the upper cover 41 to be blocked from outside air, thereby preventing changes in amplitude due to convection of outside air.

The light-source unit 48 includes, as depicted in FIG. 9, a printed board 50, the semiconductor laser 51, a holder member 53, a coupling lens 54, and an adjusting screw 56 and an adjusting screw hole 69 serving as orientation adjusting units. The printed board 50 includes, for example, an insulating board and a wiring pattern formed on the external surface of the board.

The semiconductor laser 51 forms a light-source unit recited in the present embodiment, being implemented on the printed board 50. That is the light-source unit 48 includes the semiconductor laser 51 as a light-source unit of the process cartridge 6. The semiconductor laser 51 emits a light beam 59 toward the photosensitive drum 8.

The holder member 53 includes a thick-plate-shaped holder body 63, a pair of columnar supports 64, a laser positioning hole 65, a pair of protrusions 66, a pair of mounting seat faces 68, and the adjusting screw hole 69. The holder body 63 is provided with a spindle 70 protruding from both ends of the sub-scanning direction Z toward the sub-scanning direction Z.

The pair of columnar supports 64 is provided at positions on the outer edge of the holder body 63 facing each other across the center of the holder body 63, and protrudes from the holder body 63 toward the printed board 50. The columnar supports 64 are superposed on the printed board 50 and, with a screw penetrating through the printed board 50 being screwed, the holder member 53 is fixed to the printed board 50.

The laser positioning hole 65 penetrates through the holder body 63, and is disposed at the center of the holder body 63. With the semiconductor laser 51 entering inside of the laser positioning hole 65, the semiconductor laser 51 is appropriately positioned.

The pair of mounting seat faces 68 is formed in a flat plate shape, each connected to the spindle 70. The pair of mounting seat faces 68 has their front surfaces on an approximately same plane as the external surface of the holder body 63. The adjusting screw hole 69 is provided at one end of the holder body 63 in the main scanning direction X, penetrating through the holder body 63. The adjusting screw hole 69 configures an orientation adjusting unit in the present embodiment.

The pair of protrusions 66 is formed in a convex manner from the holder body 63 in a direction away from the printed board 50, that is, toward the deflecting unit 39. The pair of protrusions 66 has positioned therebetween the laser positioning hole 65. The outer edge of each of the protrusions 66 is formed along an inner edge of the fitting hole 45 explained above. The pair of protrusions 66 fit in the fitting hole 45 to position the light-source unit 48 with respect to the optical housing 35. Also, each of the protrusions 66 has formed on its inner surface a groove 71 in a U shape in cross section formed on the same plane as the inner surface of the laser positioning hole 65.

The position of the coupling lens 54 in the optical axis direction Y with respect to the semiconductor laser 51 is adjusted so that the optical axis of the coupling lens 54 matches the optical axis of the semiconductor laser 51 and the emitted light beam 59 becomes parallel light. With an ultraviolet (UV) adhesive being filled in a space formed with the inner surface of the groove 71 of each of the pair of protrusions 66, the coupling lens 54 is fixed to the protrusion 66, that is, the holder body 63.

The adjusting screw 56 is screwed into the adjusting screw hole 69. With the amount of screwing the adjusting screw 56 into the adjusting screw hole 69 adjusted as appropriate, the amount of protrusion from the holder body 63 to the optical housing 35 is changed as appropriate. The adjusting screw 56 and the adjusting screw hole 69 form orientation adjusting units in the present embodiment.

In the above-configured light-source unit 48, the protrusion 66 is inserted into the fitting hole 45 of the optical housing 35 to be pressed and fixed with the rotational direction being appropriately positioned. With the screws penetrating through the side plate 43 of the optical housing 35 being screwed into the mounting seat faces 68, the light-source units 48 and 49 are fixed to the optical housing 35.

At this time, when the amount of protrusion of the adjusting screw 56 from the holder body 63 is changed as appropriate, the adjusting screw 56 abuts on the side plate 43 of the optical housing 35. According to the amount of protrusion, the holder member 53 is elastically deformed with the spindle 70 being taken as a rotational shaft, thereby adjusting the inclination in an arrow direction (B direction). In this manner, the radiation position of the light beam 59 incident onto a deflection plane 95 of the vibrating mirror 85, which will be explained further below, of the deflecting unit 39 can be changed.

With this, the radiation position of the light beam 59 onto the deflection plane 95 of the vibrating mirror 85, which will be explained further below, of the deflecting unit 39 in the main scanning direction X can be adjusted to be on the rotational axis of the deflection plane 95. Therefore, even when the deflection plane 95 is deformed to be wavy, wave aberration of the light beam 59 reflected on the deflection plane 95 can be suppressed. Also, a shift in the image-forming position of the spot-shaped light beam (focus shift) can be suppressed, thereby suppressing a deterioration in quality of an image to be formed.

The cylinder lens 38 is accommodated in the optical housing 35. The cylinder lens 38 is provided with its orientation being deflectable in the sub-scanning direction Z. The cylinder lens 38 has the light beam 59 emitted from the light-source unit 48 entering there, and emits the light beam 59 toward the deflection plane 95 of the vibrating mirror 85, which will be explained further below, of the deflecting unit 39. The cylinder lens 38 causes the light beam 59 to converge on the deflection plane 95 of the vibrating mirror 85 in the sub-scanning direction Z.

The deflecting unit 39 includes, as depicted in FIG. 6, a circuit board 83, a supporting member 84, the vibrating mirror 85, and a driving circuit (not shown) implemented on the circuit board 83. In the present embodiment, as a scheme of generating rotary torque of the vibrating mirror 85, an electromagnetic driving scheme is exemplarily explained.

The circuit board 83 includes an insulating board and a wiring pattern formed on the surface of the board. On the circuit board 83, a control integrated circuit (IC) and a quartz oscillator configuring the driving circuit of the vibrating mirror 85, a connector 86, and other components are implemented. Through the connector 86, power is supplied from a power supply, and control signals are input and output therethrough.

The supporting member 84 is molded of synthetic resin. The supporting member 84 is positioned at a predetermined position on the circuit board 83, protruding from the circuit board 83. The supporting member 84 has mounted thereon the vibrating mirror 85. The supporting member 84 integrally includes a positioning unit 87 that positions the vibrating mirror 85 so that a torsional bar 97, which will be explained further below, is orthogonal to the main scanning direction X and the deflection plane 95 is inclined at a predetermined angle, 22.5 degrees in the present embodiment, with respect to the main scanning direction X, a pressing nail 88 engaged with an outer edge of an implementation board 90 of the vibrating mirror 85, and an edge connector portion 89 on which a group of metal terminals are arranged so that a wiring terminal 127, which will be explained further below, formed on one side of the implementation board 90 of the vibrating mirror 85 is in contact at the time of mounting.

In the vibrating mirror 85, as depicted in FIG. 7, the deflection plane 95 is pivotally supported by the torsional bar 97. As will be explained further below, the vibrating mirror 85 is manufactured through etching from an Si board with penetration through an outer shape and then insertion into the implementation board 90. In the present embodiment, paired Si boards are laminated back to back, and the integrated module obtained through lamination is depicted.

Thus obtained vibrating mirror 85 is supported to the supporting member 84 by inserting one side of the implementation board 90 in the edge connector portion 89 explained above, engaging an outer edge with the pressing nail 88, and causing both side surfaces of the implementation board 90 to go along the positioning unit 87. With this, electrical wirings are simultaneously achieved, and each vibrating mirror 85 can be individually replaced.

The vibrating mirror 85 includes, as depicted in FIGS. 7 to 10, the implementation board 90 and a mirror unit 91. The implementation board 90 is provided thereon with a frame-shaped seat 92 on which the mirror unit 91 is mounted, and a yoke 93 formed so as to surround the mirror unit 91. The yoke 93 has mounted thereon paired permanent magnets 94. In these paired permanent magnets 94, an S pole and an N pole face each other along a direction orthogonal to a longitudinal direction of the torsional bar 97. The paired permanent magnets 94 generate a magnetic field in a direction orthogonal to the longitudinal direction of the torsional bar 97.

The mirror unit 91 includes a movable unit 96 that forms the deflection plane 95 on its surface to serve as a vibrator, the torsional bar 97 with one end connected to both ends of the movable unit 96 in the sub-scanning direction Z and protruding from both ends in the sub-scanning direction Z along the sub-scanning direction Z to serve as a protruding rotational shaft, and a frame 98 (corresponding to a frame body) with its inner edge connected to the other end of the torsional bar 97 to serve as a supporting portion. The mirror unit 91 is formed by cutting at least one Si board through etching. In the present embodiment, the mirror unit 91 is obtained by using a wafer called Silicon On Insulator (SOI) board previously bonded with an oxide film being interposed between two boards 105 and 106 having 60 micrometers and 140 micrometers, respectively.

The movable unit 96 includes a vibrating plate 100 on which a flat coil 99 (depicted in FIG. 8), a reinforcing bar 101 protruding from both ends of the vibrating plate 100 in the main scanning direction X, and a movable mirror 102 laminated on the vibrating plate 100 and having formed thereon the deflection plane 95 explained above. The torsional bar 97 can be twisted, and such twisting causes the movable unit 96, that is, the deflection plane 95, to be rotatable. The frame 98 is configured of paired frames 103 and 104 laminated together.

The mirror unit 91 explained above is formed in the following manner. First, from a front surface side of the board (second board) 105 having a thickness of 140 micrometers, portions other than the reinforcing bar 101 and the frame 103 that form a skeletal frame of the torsional bar 97, the vibrating plate 100 on which the flat coil 99 is formed, and the movable unit 96 are pierced to the oxide film through a dry process of plasma etching. Next, from a front surface side of the board (first board) 106 having a thickness of 60 micrometers, portions other than the movable mirror 102 and the frame 104 are pierced to the oxide film through anisotropic etching with KOH or the like. Finally, a portion of the oxide film surrounding the movable unit 96 is removed and separated to form the mirror unit 91.

The width of the torsional bar 97 and the reinforcing bar 101 is assumed to be 40 to 60 micrometers. As explained above, a moment of inertia I of the movable unit 96 is preferably small for a large deflection angle of the movable unit 96, that is, the deflection plane 95. By contrast, since the deflection plane 95 is deformed with inertial force, the movable unit 96 has a lightened configuration in the present embodiment.

Furthermore, on the surface of the board 106 having a thickness of 60 micrometers including the surface of the movable mirror 102, the deflection plane 95 is formed through vapor deposition of an aluminum thin film. On the surface of the substrate 105 having a thickness of 140 micrometers, the flat coil 99, terminals 107 wired via the torsional bar 97, and a trimming patch 108 are formed with a copper thin film. As a matter of course, the configuration can be such that a thin-film permanent magnet 94 is provided on a vibrating plate 100 side and the flat coil 99 is formed on the frame 104 side.

The mirror unit 91 is mounted on the seat 92 with the front of the deflection plane 95 upward. In the mirror unit 91, with a current flowing across the terminals 107, a Lorentz force occurs at each side parallel to the torsional bar 97 of the flat coil 99, thereby causing the torsional bar 97 to be twisted to cause a rotary torque for rotating the movable unit 96, that is, the deflection plane 95. When the current is cut out, with the resilience of the torsional bar 97, the movable unit 96 returns to a position on the same plane as that of the frame 98. Therefore, by alternately switching the direction of the current flowing through the flat coil 99, the movable mirror 102 can be vibrated in a reciprocating manner.

In view of variation with time, the light beam 59 for scanning the deflection plane 95 of the vibrating mirror 85 is detected at a synchronization detection sensor 115 disposed at a start end of a scanning area, based on a time difference between a detection signal for detection at the time of return scanning and a detection signal for detection at the time of forward scanning, thereby controlling so that the deflection angle of the deflection plane is constant. During a period from the detection of the light beam 59 at the time of return scanning to the detection of the light beam 59 at the time of forward scanning, light emission of the semiconductor laser 51 as a light-emitting source is prohibited.

The deflecting unit 39 explained above is accommodated in the optical housing 35 and causes the light beam 59 to be guided from the cylinder lens 38 to the deflection plane 95. The deflecting unit 39 then deflects the light beam 59 guided onto the deflection plane 95 for emission toward an fθ lens 116, which will be explained further below, in the image-forming optical system 32. At this time, the orientation of the light beam 59 is adjusted by the adjusting screw 56 so that the light beam enters a center portion of the deflection plane 95 of the vibrating mirror 85. The light beam 59 is then deflected by the deflection plane 95 of the vibrating mirror 85 to enter the fθ lens 116. The deflecting unit 39 is accommodated in the optical housing 35 and is blocked from outside air, thereby preventing changes in amplitude due to convection of outside air.

The light-source device 31 explained above emits the light beam 59 from the semiconductor laser 51 of the light-source unit 48 toward the fθ lens 116. The light-source device 31 is fixed with the pair of plate members 34 parallel to each other, screws, and others.

The image-forming optical system 32 includes, as depicted in FIG. 3 or 4, the fθ lens 116 as a scanning lens and a folding mirror 118. The fθ lens 116 is formed in a bar shape with its longitudinal direction being parallel to the longitudinal direction of the photosensitive drum 8, is mounted on the inside of the emission window 46 of the optical housing 35 explained above, and is fixed with an adhesive. The fθ lens 116 is formed in a convex shape in a direction in which a center portion in the main scanning direction X is away from the vibrating mirror 85. The fθ lens 116 lets the light beam 59 pass therethrough, and has a convergence force in the sub-scanning direction Z.

The folding mirror 118 is formed in a band shape parallel to the longitudinal direction of the photosensitive drum 8. The folding mirror 118 is disposed at a portion as appropriate so as to guide the light beam 59 passing through the fθ lens 116 to the external surface of the photosensitive drum 8.

In the above-configured image-forming optical system 32, the light beam 59 enters the fθ lens 116 from the deflection plane 95 of the vibrating mirror 85 in the light-source device 31. The light beam 59 passing through the fθ lens 116 from the light-source unit 48 is reflected on the folding mirror 118 to form an image in a spot shape on the photosensitive drum 8, thereby forming an electrostatic latent image based on image information.

The laser writing unit 22 configured above includes, as depicted in FIG. 4, the synchronization detection sensor 115 for driving the semiconductor laser 51 in the light-source unit 48 in a synchronous manner. The light beam 59 deflected on the deflection plane 95 of the vibrating mirror 85 passes beside the fθ lens 116 as a scanning lens and then converges by an image-forming lens 122 to enter the synchronization detection sensor 115. The synchronization detection sensor 115 detects a time difference between the detection signal for detection at the time of return scanning and a detection signal for detection at the time of forward scanning and, based on the detection signals, controls the deflection angle of the deflection plane so that the deflection angle is constant.

According to the present embodiment, the light-source unit 48 includes the adjusting screw 56 and the adjusting screw hole 69 serving as orientation adjusting units that adjust the radiation position of the light beam 59 from the semiconductor laser 51 onto the deflection plane 95 of the vibrating mirror 85 in the main scanning direction X. Therefore, it is possible to radiate with the light beam 59 the center of the deflection plane 95 of the vibrating mirror 85 in the main scanning direction X. Therefore, even if a mounting or processing tolerance occurs, the light beam 59 can be guided to the center of the vibrating mirror 85 in the main scanning direction X.

Therefore, even if the deflection plane 95 of the vibrating mirror 85 is deformed to look wavy, since the amount of deformation at the center of the deflection plane 95 is small, the vibrating mirror 85 does not have to be made thicker. Thus, it is possible to prevent an increase in thickness of the light beam 59 at the image-forming position and also prevent the occurrence of a focus shift. Also, the occurrence of scattered light, such as flare light, due to vignetting of the light beam 59 can be suppressed, thereby forming an image with high quality without a deterioration in image quality, such as scumming. Also, with a decrease in moment of inertia due to downsizing the vibrating mirror diameter, high speed, wide angle, and high image quality can be achieved.

Also, since the image forming apparatus 1 includes the laser writing unit 22 explained above, a deterioration in image quality due to vignetting of the light beam 59 can be prevented, and the vibrating mirror 85 can be downsized. With this, high image quality, downsizing and high speed can be achieved.

In the embodiment explained above, with the adjusting screw 56 being screwed into the holder member 53 of the light-source unit 48, thereby making it possible to change the orientation of the light beam 59 in the main scanning direction X. Alternatively, in the present embodiment, the unit that changes the orientation of the light beam 59 in the main scanning direction X may be provided to any of optical elements of an optical system before entering the vibrating mirror 85.

Figure 22:
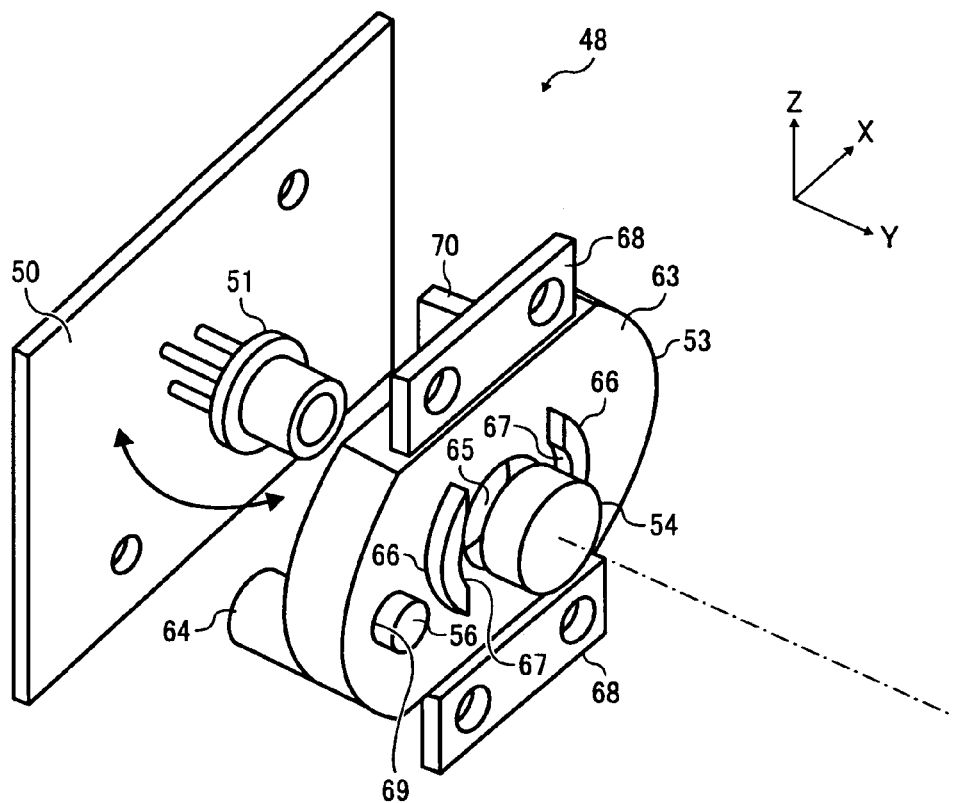
FIGS. 22 and 23 are drawings of examples of adjusting the orientation of a light source in the first to fourth embodiments.
Figure 23:
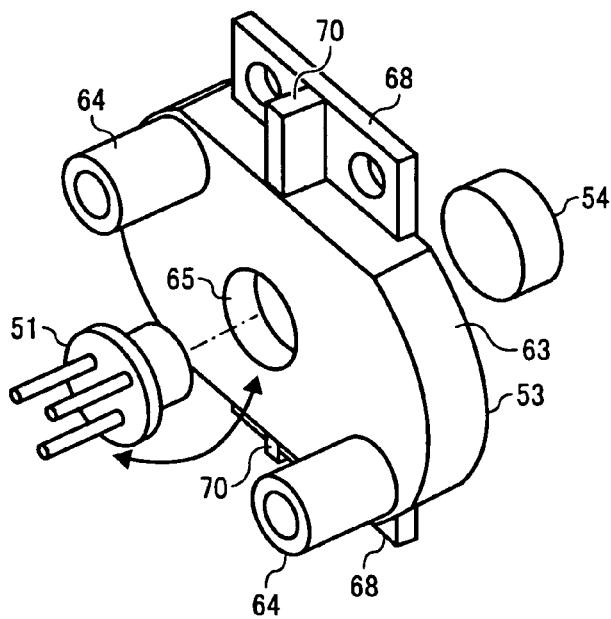

The configuration may be such that the orientation of the light source or the single coupling lens is adjusted to adjust the radiation position on the vibrating mirror in the main scanning direction. FIGS. 22 and 23 are drawings depicting the adjustment of depict the orientation of the single light source. The orientation of the board 50 to which the light source is attached is adjusted with respect to the holder member 53 of the coupling lens 54 to adjust the orientation of the single light source, thereby adjusting the radiation position on the vibrating mirror in the main scanning direction.

Figure 24:
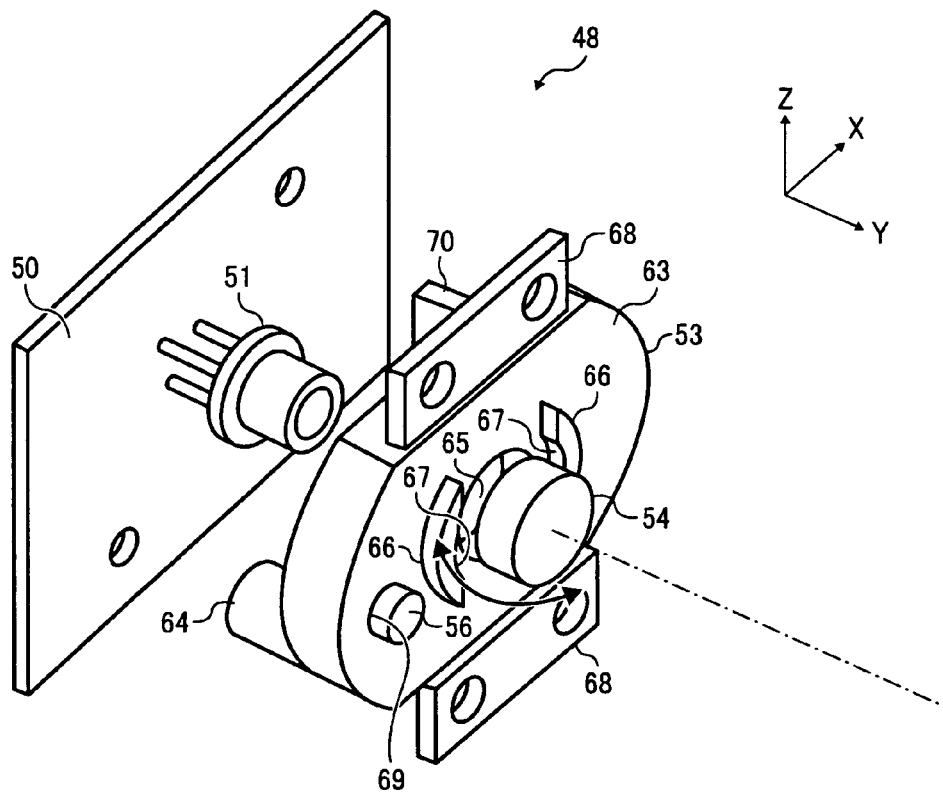
FIGS. 24 and 25 are drawings of examples of adjusting the orientation of a coupling lens in the first to fourth embodiments.
Figure 25:
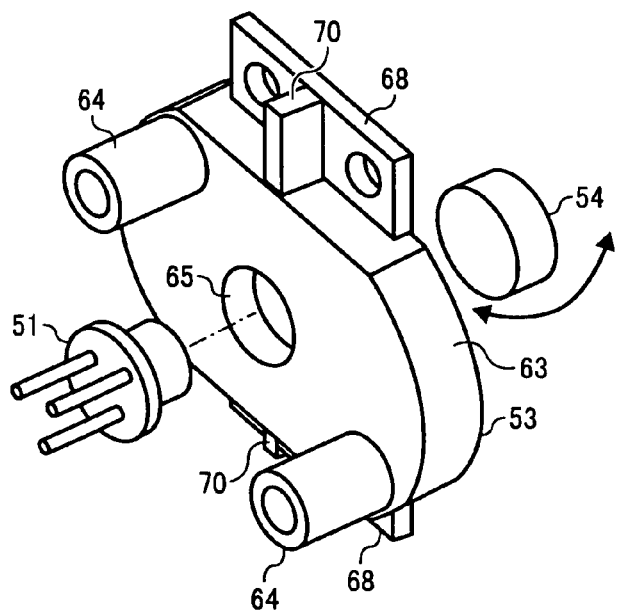

FIG. 24 is a drawing of depicting the adjustment of the orientation of the single coupling lens 54. The coupling lens 54 is adhered and fixed at a space between a groove and an inner surface with a UV adhesive. At this time, a beam from the light source is lit to adjust the orientation of the coupling lens 54 for adherence and fixing while checking a shift in optical axis of the light source and the coupling lens 54. Adjustment may be performed after mounting on the optical housing 35 by making a shift in optical axis in a desired direction while checking the radiation position on the vibrating mirror. By adhering and fixing the coupling lens as explained above, the orientation of the single coupling lens can be adjusted so that the radiation position on the vibrating mirror is adjusted in the main scanning direction.

Figure 26:
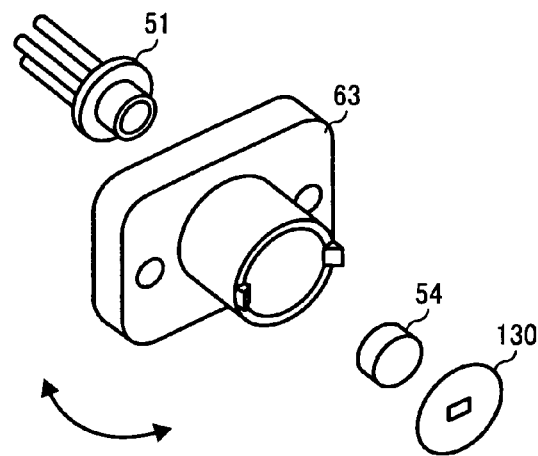
FIG. 26 is a drawing of an example of adjusting the orientation of the light-source unit including the diaphragm unit in the first to fourth embodiments.

Also, as depicted in FIG. 26, the orientation of the light-source unit integrated with an aperture 130 (diaphragm unit) may be adjustable. At this time, the orientation is adjusted based on the amount of protrusion by an adjusting screw (not shown) abutting on the optical housing 35, thereby adjusting the radiation position on the vibrating mirror in the main scanning direction.

Figure 27:
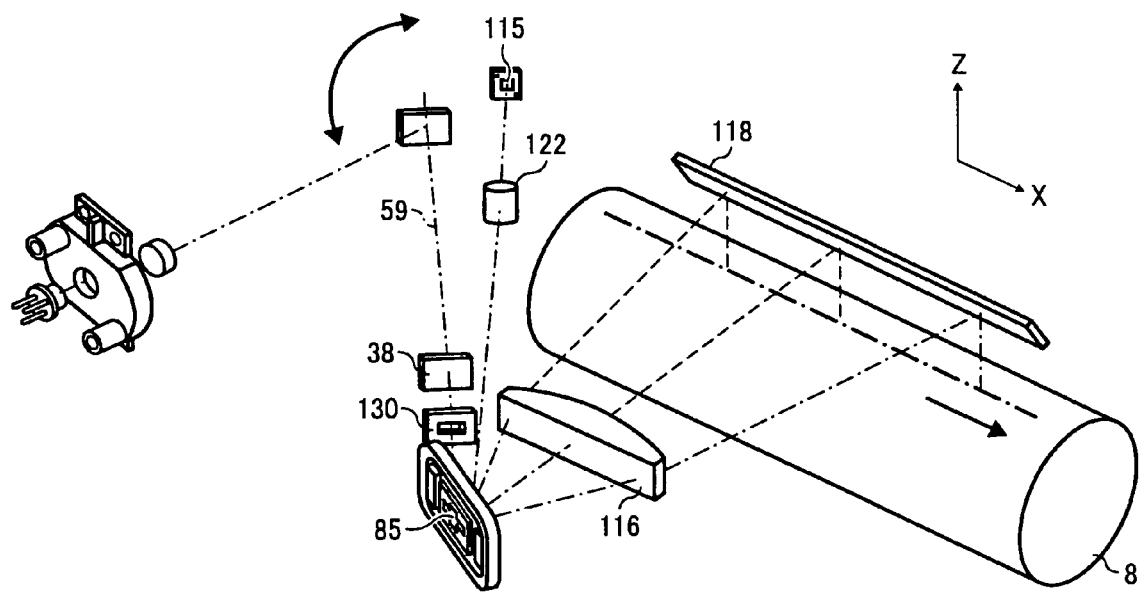
FIG. 27 is a drawing of an example of adjusting the orientation of a light-guiding unit in the first to fourth embodiments.

Furthermore, as depicted in FIG. 27, a light-guiding mirror that guides the light beam from the light source to the vibrating mirror 85 can be further disposed for layout of the optical system. At this time, by providing the light-guiding mirror with an orientation adjusting unit as explained above, the radiation position on the vibrating mirror 85 can be adjusted in the main scanning direction.

Still further, in the embodiment explained above, the orientation adjusting unit that changes the orientation of the light beam 59 from the semiconductor laser 51 in the main scanning direction X is provided. Alternatively, the light-source unit 48 may be provided with a position adjusting unit that moves in parallel to the light beam 59 from the semiconductor laser 51 in the main scanning direction X. With this, the radiation position of the light beam 59 onto the deflection plane 95 of the vibrating mirror can be adjusted in the main scanning direction X, and therefore the radiation position of the light beam 59 incident on the deflection plane 95 of the vibrating mirror 85 in the deflecting unit 39 can be changed. Also, the center of the deflection plane 95 of the vibrating mirror in the main scanning direction X can be reliably radiated with the light beam 59. For this reason, even if a mounting or processing tolerance occurs, the light beam 59 can be reliably guided to the center of the deflection plane 95 of the vibrating mirror 85 in the main scanning direction X.

Figure 28:
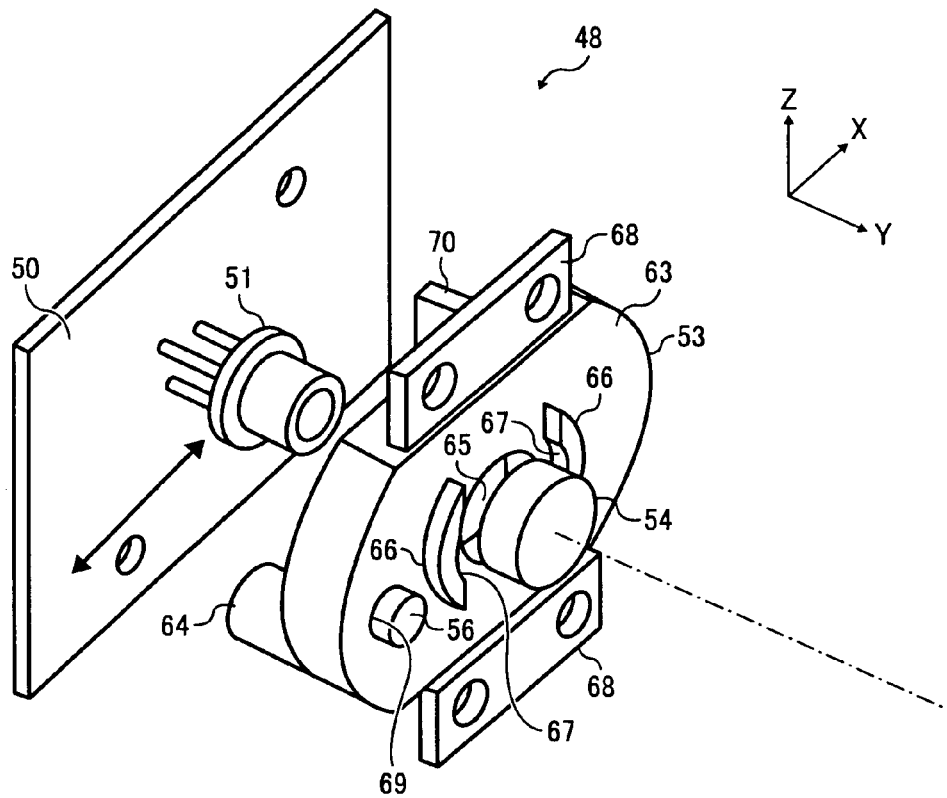
FIGS. 28 and 29 are drawings of examples of adjusting the position of the light source unit in the first to fourth embodiments.
Figure 29:
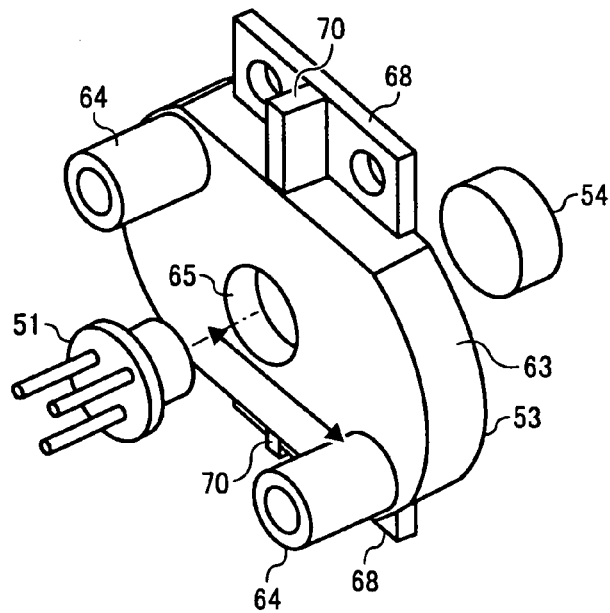

FIGS. 28 and 29 depict the state where the single light source is shift-adjusted in the main-scanning direction. By providing the board to which the light source is adhered is provided with a mechanism, such as a micro-machine, capable of adjusting the position in the main scanning direction, the position of the single light source in the main scanning direction can be adjusted.

Figure 30:
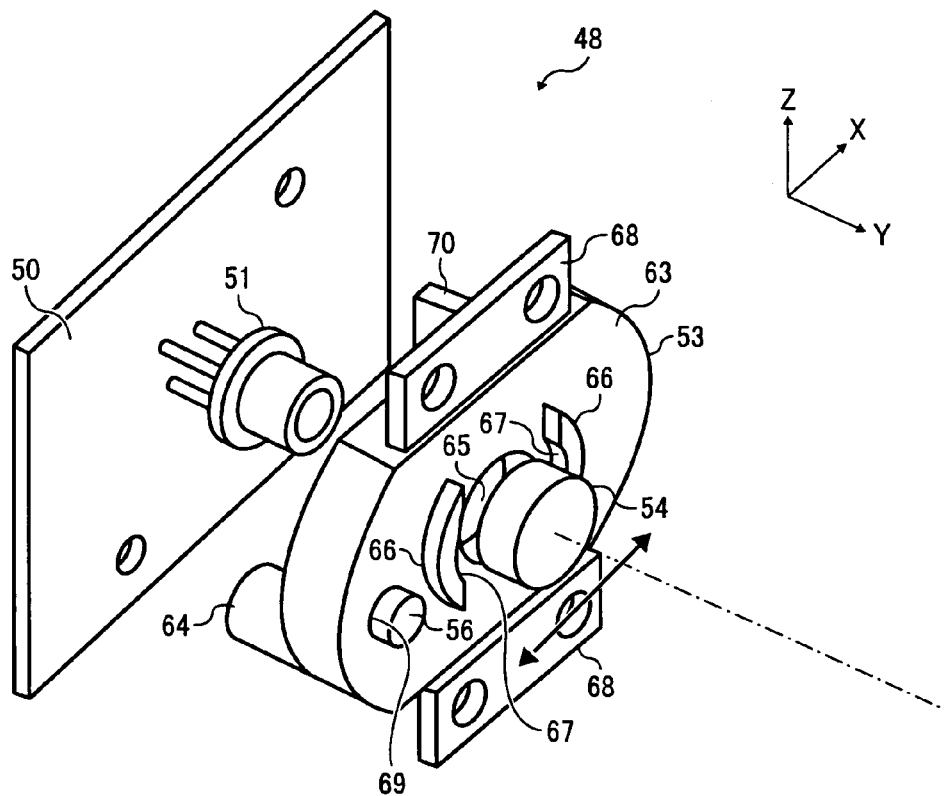
FIGS. 30 and 31 are drawings of examples of adjusting the position of the coupling lens in the first to fourth embodiments.
Figure 31:
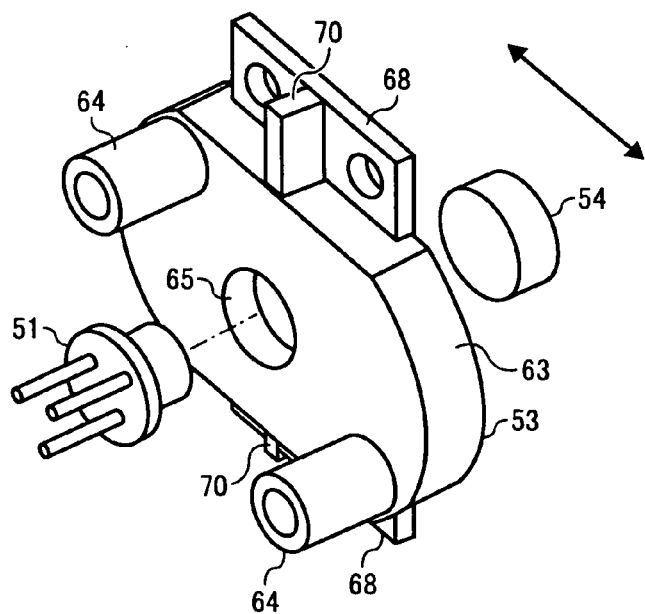

FIGS. 30 and 31 are drawings that depict the state in which the single coupling lens 54 can be shift-adjusted in the main scanning direction. As explained above, the coupling lens 4 is fixed and adhered by filling a UV adhesive in the groove and the inner surface. Therefore, when fixing and adherence, the position of the holder member 53 of the coupling lens 54 in the main scanning direction is adjusted to adjust the position of the single coupling lens 54 in the main scanning direction, thereby adjusting the radiation position of the single coupling lens 54 in the main scanning direction. With this, the radiation position on the vibrating mirror can be adjusted in the main scanning direction.

Figure 32:
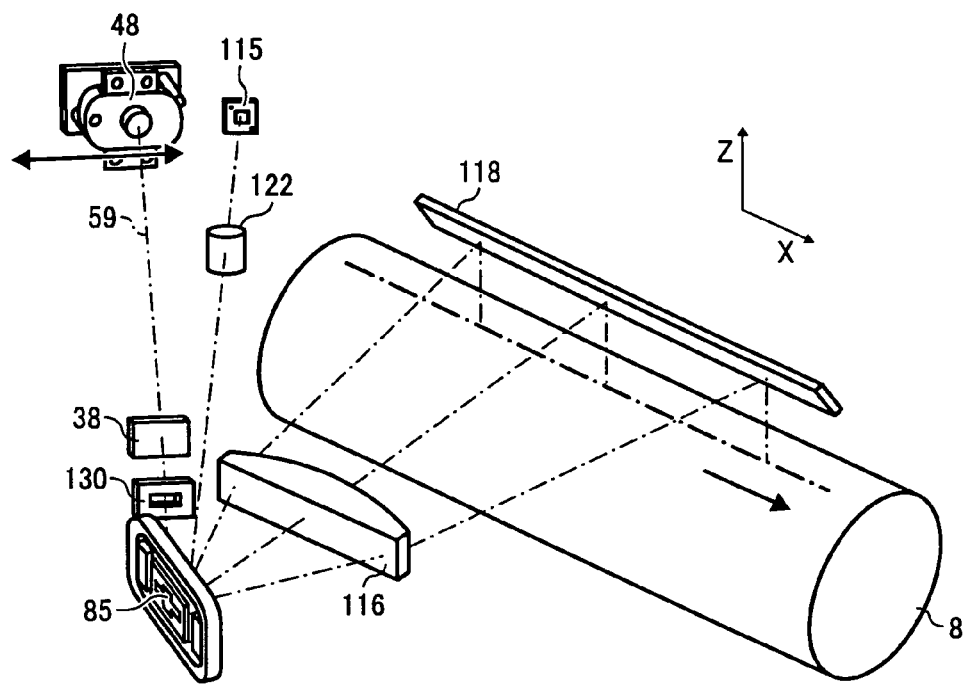
FIG. 32 is a drawing of an example of adjusting the position of the light-source unit in the first to fourth embodiments.

Still further, as depicted in FIG. 32, the position of the light-source unit 48 having the light source and the coupling lens integrated together in the main scanning direction may be similarly adjusted.

Figure 33:
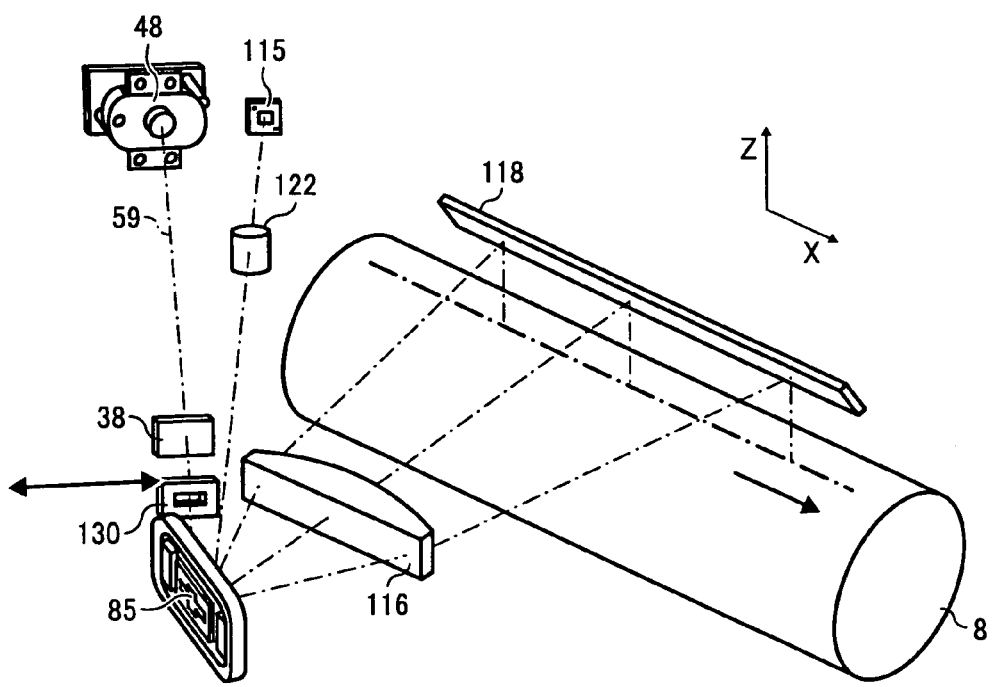
FIG. 33 is a drawing of an example of adjusting the position of the diaphragm unit in the first to fourth embodiments.

Still further, as depicted in FIG. 33, the position of the aperture (diaphragm unit) 130 in the main scanning direction may be adjusted.

Figure 34:
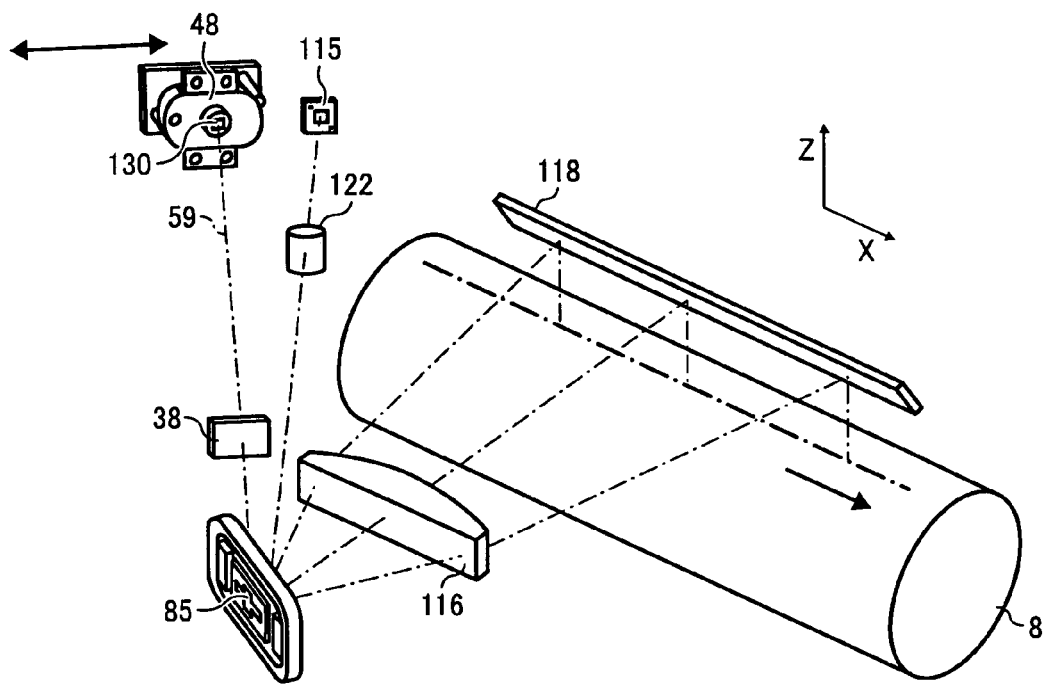
FIG. 34 is a drawing of an example of adjusting the position of the light-source unit including the diaphragm unit in the first to fourth embodiments.

Still further, as depicted in FIG. 34, with the aperture (diaphragm unit) 130 being integrated with the light source and the coupling lens together, the position of the light source unit 48 including the diaphragm unit in the main scanning direction may be adjusted.

Still further, in the present embodiment, the adjusting unit that adjusts the orientation and position of the light beam 59 from the semiconductor laser 51 in the main scanning direction X is provided to the light-source unit 48. Alternatively, in the present embodiment, the adjusting unit may be provided to any optical element in the optical system in front of the deflecting unit 39 to adjust the incident position of the light beam 59 onto the deflection plane 95 of the vibrating mirror 85 in the main scanning direction X.

Figure 13:
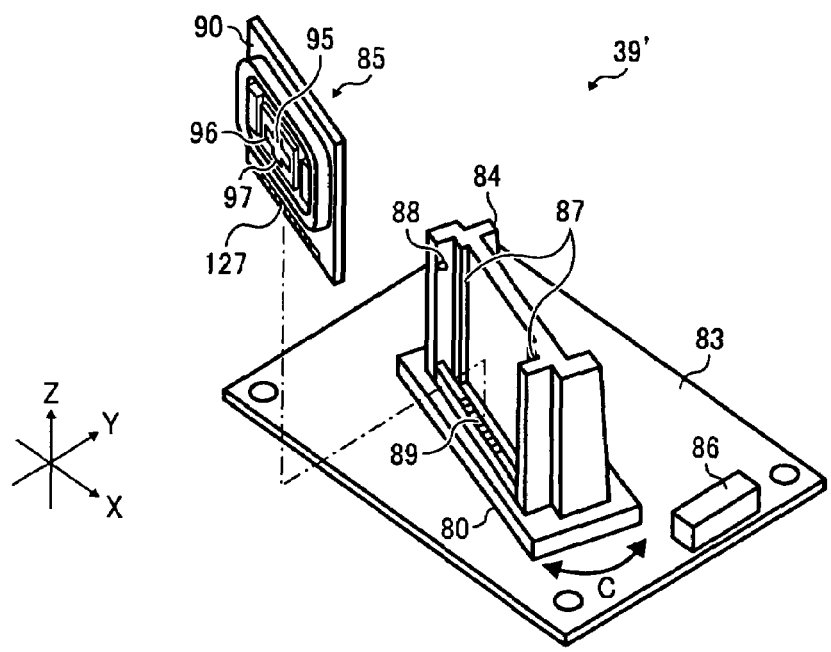
FIG. 13 is an exploded perspective view of a deflecting unit of a light-source device in a laser writing unit as an optical scanning device of an image forming apparatus according to a second embodiment.

Next, a second embodiment of the present invention is explained with reference to FIG. 13. FIG. 13 is a perspective view of a deflecting unit 39' including a vibrating mirror 85 as an optical deflecting unit of a laser writing unit of an image forming apparatus according to the second embodiment. In FIG. 13, portions identical in configuration to those in the first embodiment explained above are provided with the same reference numerals, and are not explained herein.

The deflecting unit 39' including the vibrating mirror 85 as an optical deflecting unit according to the present embodiment is provided with, as depicted in FIG. 13, a rotating member 80 as an orientation adjusting unit according to the present embodiment between the circuit board 83 and the supporting member 84. The rotating member 80 is formed in a flat plate shape, and has a surface on which the supporting member 84 is fixed with an adhesive. With this, the supporting member 84 is mounted. The rotating member 80 is superposed on the surface of the circuit board 83. With the center of the rotating member 80 being fixed with an adjusting screw not shown, the rotating member 80 is mounted on the circuit board 83 so as to be movable in a rotating direction (a direction indicated by an arrow C).

The supporting member 84 is mounted on the rotating member 80 movably mounted on the circuit board 83 in the rotating direction (the direction indicated by the arrow C). Therefore, the supporting member 84 on which the vibrating mirror 85 as an optical deflecting unit is mounted can be moved on the circuit board 83 in the rotating direction (the direction indicated by the arrow C), thereby adjusting the inclination of the vibrating mirror in the rotating direction (the direction indicated by the arrow C).

Figure 35:
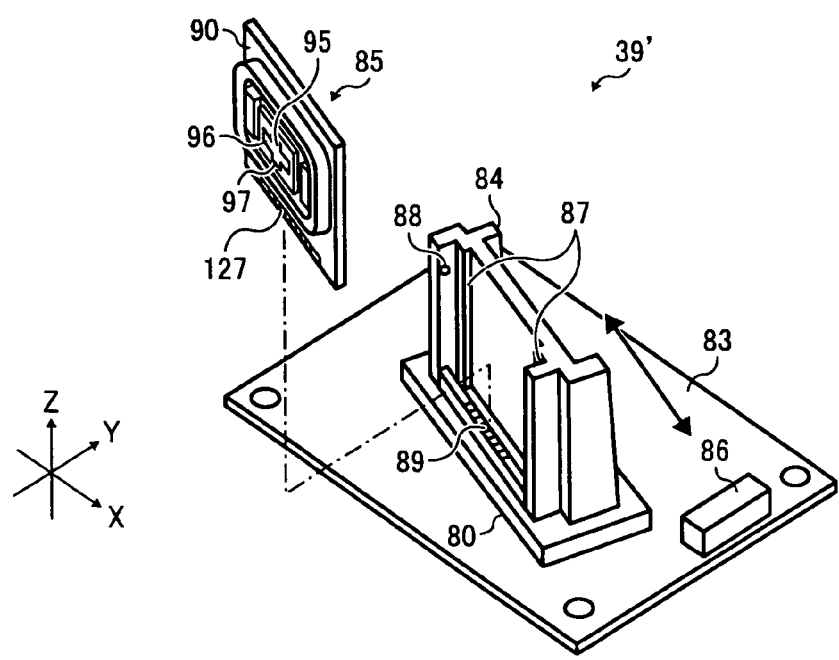
FIG. 35 is a drawing of an example of adjusting the position of a vibrating mirror unit in the first to fourth embodiments.

As depicted in FIG. 35, the deflection unit 39' is provided with a micro-machine (not shown) or the like to form a configuration positionally adjustable in the main scanning direction. With this, the beam from the light source can be adjusted for radiating the center on the vibrating mirror.

In this manner, the radiation position of the light beam 59 onto the deflection plane 95 of the vibrating mirror 85 in the deflecting unit 39' in the main scanning direction X can be adjusted. Therefore, the radiation position of the light beam 59 onto the deflection plane 95 of the vibrating mirror 85 in the deflecting unit 39' in the main scanning direction X can adjusted so as to be on the rotating axis of the deflection plane 95. Thus, even when the deflection plane 95 is deformed to be wavy, wave aberration of the light beam 59 reflected on the deflection plane 95 can be suppressed. Also, a shift in the image-forming position of the spot-shaped light beam (focus shift) can be suppressed, thereby suppressing a deterioration in quality of an image to be formed.

According to the present embodiment, the deflecting unit 39' includes the rotating member 80 as a deflecting-unit adjusting unit that adjusts the radiation position of the light beam 59 from the semiconductor laser 51 onto the deflection plane 95 of the vibrating mirror 85. Therefore, the center of the deflection plane 95 of the vibrating mirror 85 in the main scanning direction X can be radiated with the light beam 59. Therefore, even if a mounting or processing tolerance occurs or the vibrating mirror 85 is downsized, the light beam 59 can be guided to the center of the vibrating mirror 85 in the main scanning direction X.

Therefore, even if the deflection plane 95 of the vibrating mirror 85 is deformed to look wavy, since the amount of deformation at the center of the deflection plane 95 is small, the vibrating mirror 85 does not have to be made thicker. Thus, it is possible to prevent an increase in thickness of the light beam 59 at the image-forming position and also prevent the occurrence of a focus shift. Also, the occurrence of scattered light, such as flare light, due to vignetting of the light beam 59 can be suppressed, thereby forming an image with high quality without a deterioration in image quality, such as scumming. Thus, high speed, wide angle, and high image quality can be achieved.

Figure 14:
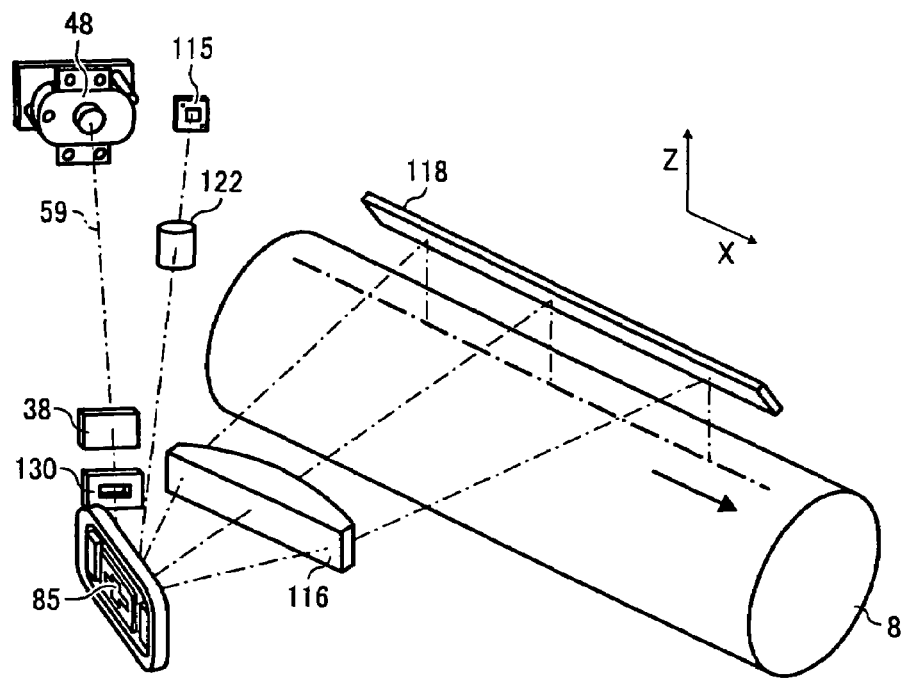
FIG. 14 is a perspective view of main portions, such as a laser writing unit and photosensitive members, of an image forming apparatus according to a third embodiment.
Figure 15:
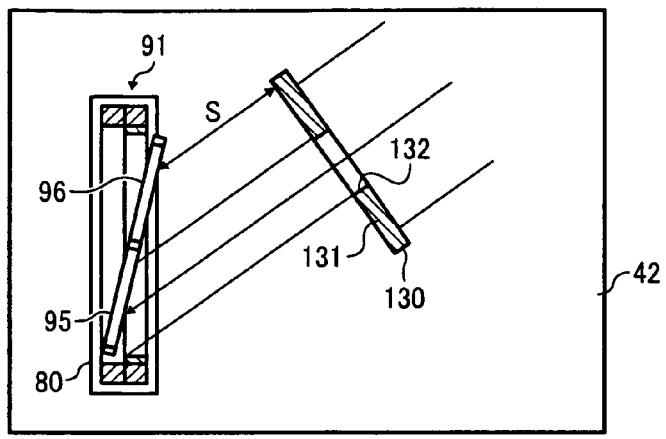
FIGS. 15 to 17 are drawings for explaining, for example, a vibrating mirror as an optical deflecting unit of the laser writing unit as an optical scanning device in the image forming apparatus depicted in FIG. 14.
Figure 16:
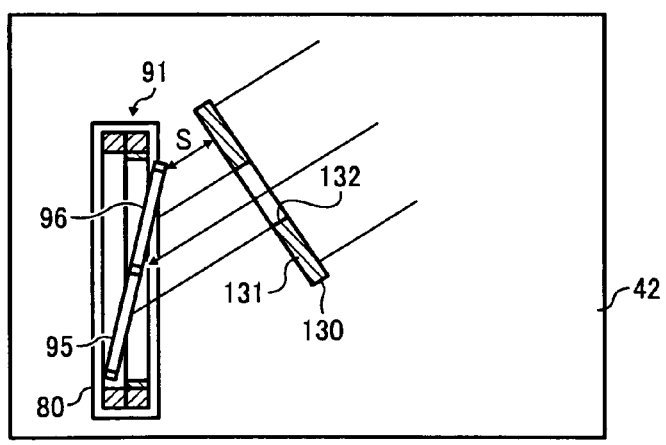
Figure 17:
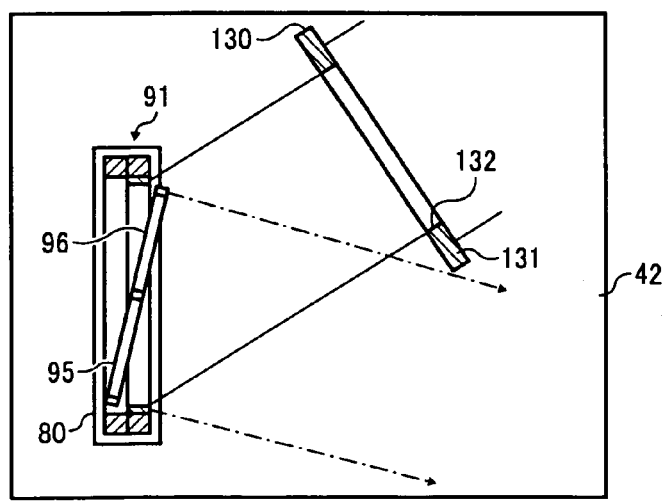

Next, a third embodiment of the present invention is explained with reference to FIGS. 14 to 17. FIG. 14 is a drawing for explaining, for example, the vibrating mirror 85 as an optical deflecting unit of a laser writing unit of an image forming apparatus according to the third embodiment. FIGS. 15 to 17 are drawings for explaining, for example, the vibrating mirror 85 as an optical deflecting unit of a laser writing unit as an optical scanning unit of the image forming apparatus depicted in FIG. 14. In FIGS. 14 to 17, portions identical in configuration to those in the first embodiment explained above are provided with the same reference numerals, and are not explained herein.

In the present embodiment, as depicted in FIG. 14, an aperture 130 as a diaphragm unit is provided between the semiconductor laser 51 of the light-source unit 48 as a light-source unit and the vibrating mirror 85, is accommodated in the optical housing 35, and is disposed between the cylinder lens 38 and the vibrating mirror 85. The aperture 130 includes a flat-plate body unit 131 and opening 132 formed so as to penetrate through the center of the body unit 131. The opening 132 is formed in a rectangular shape with the main scanning direction X being taken as a longitudinal direction.

When the light beam 59 from the semiconductor laser 51 of the light-source unit 48 enters the deflection plane 95 of the vibrating mirror 85, the aperture 130 lets the light beam 59 pass through the opening 132 of the aperture 130, thereby regulating the light-beam width of the light beam 59 to a width corresponding to the deflection plane 95. In this manner, the light-beam width of the light beam 59 can be regulated with the aperture 130 in a manner such that the light beam 59 onto the deflection plane 95 of the vibrating mirror 85 in the main scanning direction X reliably enters the deflection plane 95.

At this time, as depicted in FIG. 15, if the distance between the aperture 130 and the vibrating mirror 85 (indicated by an arrow S) is long, the incident position of the light beam 59 onto the deflection plane 95 of the light beam 59 is shifted to an end, thereby causing a shift of the radiation position of the light beam 59 onto the deflection plane 95 in the main scanning direction X.

However, as depicted in FIG. 16, with the distance S between the aperture 130 and the vibrating mirror 85 being decreased, a shift of the light beam 59 in incident position can be reduced. With this, a shift in the radiation position of the light beam 59 onto the deflection plane 95 in the main scanning direction can be reduced, thereby causing the center of the deflection plane 95 of the vibrating mirror 85 to be radiated with the light beam 59.

Also, as depicted in FIG. 17, the opening 132 of the aperture 130 is formed larger than the width of the deflection plane 95 of the vibrating mirror 85 in the main scanning direction. Therefore, the light-beam width of the light beam 59 incident onto the deflection plane 95 of the vibrating mirror 85 can be larger than the width of the deflection plane 95 in the scanning direction. Thus, with the entire deflection plane 95 in the main scanning direction being radiated with the light beam 59, the light beam 59 can be reliably guided to the center of the deflection plane 95 in the main scanning direction.

According to the present embodiment, the aperture 130 as an opening is provided between a light-source unit 36 and the vibrating mirror 85. With this, the incident position of the light beam 59 on the deflection plane 95 of the vibrating mirror 85 in the main scanning direction X can be adjusted without influencing the image-forming optical system near the scanned plane from the vibrating mirror 85. Thus, it is possible to radiate with the light beam 59 the center of the deflection plane 95 of the vibrating mirror 85 in the main scanning direction X in the main scanning direction.

Furthermore, in the present embodiment, the aperture 130 is disposed near the vibrating mirror 85 between the semiconductor laser 51 of the light-source unit 48 and the vibrating mirror 85. With this, the incident position of the light beam 59 on the deflection plane 95 of the vibrating mirror 85 can be easily adjusted. Thus, it is possible to reliably radiate with the light beam 59 the center of the deflection plane 95 of the vibrating mirror 85 in the main scanning direction. Thus, the light beam 59 can be reliably deflected at the center of the deflection plane 95.

Still further, with the aperture 130 being disposed between the cylinder lens 38 and the vibrating mirror 85, the aperture 130 can be closer to the vibrating mirror 85. With this, the incident position of the light beam 59 on the deflection plane 95 of the vibrating mirror 85 in the main scanning direction X can be more effectively adjusted. Thus, it is possible to reliably radiate with the light beam 59 the center of the deflection plane 95 of the vibrating mirror 85 in the main scanning direction. Thus, the light beam 59 can be reliably deflected at the center of the deflection plane 95.

Still further, the opening 132 of the body unit 131 of the aperture 130 is formed larger than the deflection plane 95 of the vibrating mirror 85, thereby making it possible to make the light-beam width of the light beam 59 larger than the width of the vibrating mirror 85. With this, the entire deflection plane 95 in the main scanning direction can be radiated with the light beam 59. Thus, the light beam 59 can be reliably guided to the center of the deflection plane 95 in the main scanning direction. Therefore, the light beam can be reliably deflected at the center of the optical deflecting unit.

Figure 18:
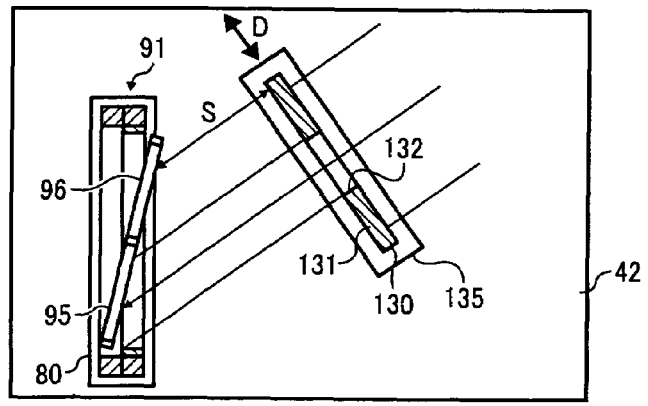
FIG. 18 is a drawing for explaining, for example, a vibrating mirror as an optical deflecting unit of a laser writing unit as an optical scanning device and an aperture as a diaphragm unit in an image forming apparatus according to a fourth embodiment.
Figure 19:
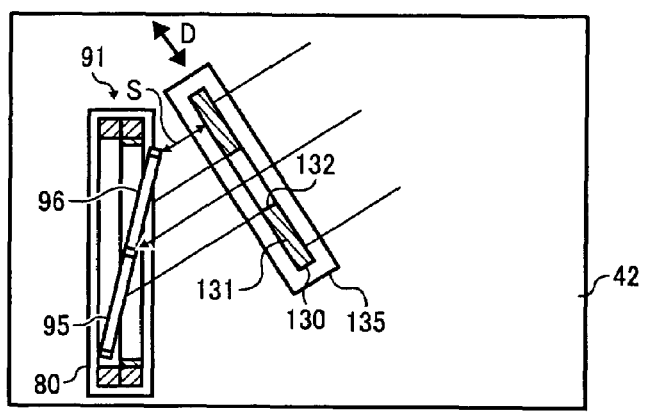
FIG. 19 depicts the aperture disposed with a short distance with the vibrating mirror in FIG. 18.
Figure 20:
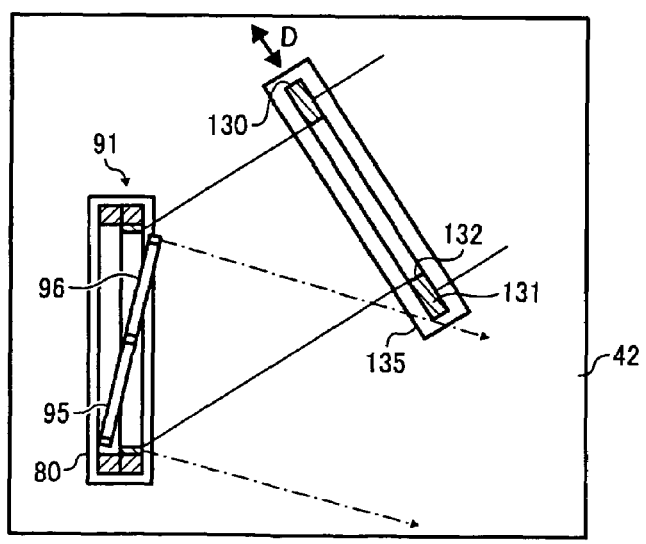
FIG. 20 is a drawing for explaining the magnitude of an opening provided to the aperture depicted in FIGS. 18 and 19.

Next, a fourth embodiment of the present invention is explained with reference to FIGS. 18 to 20. FIG. 18 is a drawing for explaining, for example, the vibrating mirror 85 as an optical deflecting unit of a laser writing unit and an aperture 130 as a diaphragm unit in an image forming apparatus according to the fourth embodiment. In FIG. 18, portions identical in configuration to those in the first embodiment explained above are provided with the same reference numerals, and are not explained herein.

In the present embodiment, as depicted in FIG. 18, the aperture 130 as a diaphragm unit includes an adjusting unit 135 as a diaphragm-unit adjusting unit that adjusts the position and inclination of the aperture 130. The adjusting unit 135 is stacked on the bottom plate 42 of the housing case 40 of the optical housing 35, and is mounted on the bottom plate 42 with its position adjustable with a screw or the like in a direction parallel to the main scanning direction X (arrow D). The aperture 130 is fixed with an adhesive or screw onto the adjusting unit 135 so as to vertically protrude therefrom.

In this manner, the aperture 130 is mounted on the housing case 40 by the adjusting unit 135, with the position adjustable in the direction parallel to the main scanning direction X (arrow D). Thus, the aperture 130 allows the radiation position of the light beam 59 onto the deflection plane 95 of the vibrating mirror 85 to be adjusted in the main scanning direction X, thereby causing center of the deflection plane 95 in the main scanning direction X to be radiated with the light beam 59.

Also, the aperture 130 may be mounted on the bottom plate 42 by the adjusting unit 135 with a screw or the like so as to be movable in a rotating direction with the center of the adjusting unit 135 being taken as an axis. With this, the aperture 130 is mounted on the housing case 40 by the adjusting unit 135 with the inclination being adjustable. The aperture 130 also can adjust the light-beam width of the light beam 59 in the main scanning direction X with respect to the deflection plane 95 of the vibrating mirror 85. Thus, the center of the deflection plane 95 in the main scanning direction X can be radiated with the light beam 59.

According to the present embodiment, since the aperture 130 includes the adjusting unit 135, the position and inclination can be adjusted in the main scanning direction X. Therefore, the light beam 59 can be adjusted in the main scanning direction X of the deflection plane 95 of the vibrating mirror 85, thereby causing the center of the deflection plane 95 in the main scanning direction X to be radiated with the light beam 59. Thus, even if a mounting or processing tolerance occurs, the light beam 59 can be reliably guided to the center of the deflection plane 95 in the main scanning direction X. Therefore, the light beam 59 can be reliably deflected at the center of the deflection plane 95.

Figure 21:
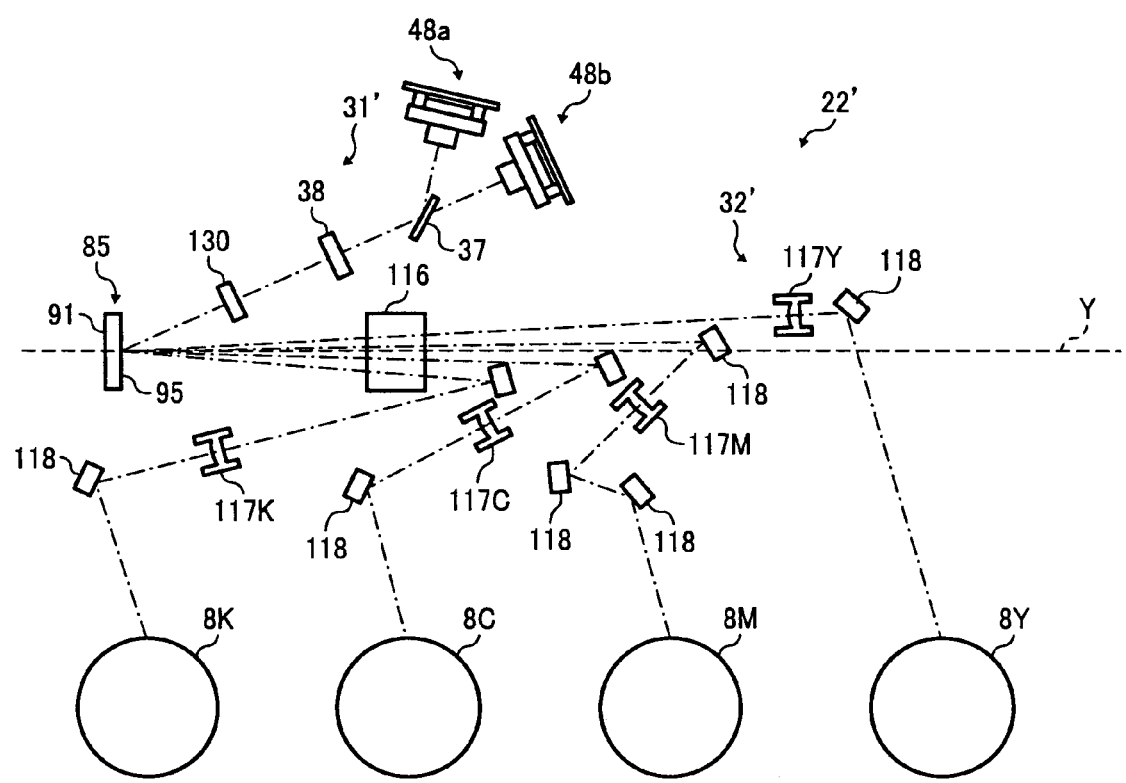
FIG. 21 is a drawing for explaining, for example, a modification example of the laser writing unit depicted in FIG. 2.

In the embodiments explained above, as the optical scanning device of the image forming apparatus 1, the external surface of one photosensitive drum 8 is scanned by the vibrating mirror 85 with the light beam 59 from the single light-source unit 48. However, the optical scanning device according to the present embodiment can also be applied to a multi-color image forming apparatus for two or more colors and, as depicted in FIG. 21, a full-color image forming apparatus in the present embodiment. FIG. 21 is a drawing for explaining, for example, a modification example of the laser writing unit depicted in FIG. 2. In FIG. 21, portions identical in configuration to those in the first embodiment are provided with the same reference numerals, and are not explained herein. In the example depicted in FIG. 21, four light beams 59, 60, 61, and 62 from a plurality of light-source units 48a and 48b of a laser writing unit 22' as an optical scanning device of the image forming apparatus are guided to a plurality of photosensitive drums 8Y, 8M, 8C, and 8K.

As depicted in FIG. 21, the laser writing unit 22' as an optical scanning device of the image forming apparatus includes a light-source device 31' and an image-forming optical system 32'. The light-source device 31' includes the optical housing 35, the light-source units 48a and 48b, an incident mirror 37, the cylinder lens 38 as a line-imaging lens, and the deflecting unit 39. The light-source units 48a and 48b each include paired semiconductor lasers (not shown) that each emit a corresponding one of the light beams 59, 60, 61, and 62 having a one-to-one correspondence with the photosensitive drums 8Y, 8M, 8C, and 8K. The light-source units 48a and 48b have disposed these two semiconductor lasers so that relevant ones of the light beams 59, 60, 61, and 62 from two semiconductor lasers form 2.5 degrees so as to cross each other on the deflection plane 95 of the vibrating mirror 85.

The incident mirror 37 is accommodated in the optical housing 35. The four light beams 59, 60, 61, and 62 from the semiconductor lasers (not shown) of the light-source units 48 and 49 enter the incident mirror 37 for emission of the four light beams 59, 60, 61, and 62. The four light beams 59, 60, 61, and 62 are emitted from the incident mirror 37 in a state where the four light beams 59, 60, 61, and 62 from the semiconductor lasers are vertically arranged in line (arranged along the sub-scanning direction Z) and spaced apart in the sub-scanning direction Z.

The image-forming optical system 32' includes an fθ lens 116 as a scanning lens, a plurality of toroidal lenses 117Y, 117M, 117C, and 117K, and a plurality of folding mirrors 118. The fθ lens 116 is disposed with its longitudinal direction being parallel to the longitudinal direction of the photosensitive drums 8Y, 8M, 8C, and 8K. The toroidal lenses 117Y, 117M, 117C, and 117K are provided so as to have a one-to-one relation with the photosensitive drums 8Y, 8M, 8C, and 8K, and is formed in a bar shape with their longitudinal direction being parallel to the longitudinal direction of the photosensitive drums 8Y, 8M, 8C, and 8K. Through the toroidal lenses 117Y, 117M, 117C, and 117K, only one of the light beams 59, 60, 61, and 62 for scanning the external surface of the corresponding one of the photosensitive drums 8Y, 8M, 8C, and 8K passes.

The folding mirrors 118 are formed in a band shape with their longitudinal direction being parallel to the longitudinal direction of the photosensitive drums 8Y, 8M, 8C, and 8K, and are disposed at positions as appropriate so as to guide the light beams 59, 60, 61, and 62 passing through the fθ lens 116 via the toroidal lenses 117Y, 117M, 117C, and 117K to the external surfaces of the photosensitive drums 8Y, 8M, 8C, and 8K.

The laser writing unit 22' as an optical scanning device of the image forming apparatus configured above emits four light beams 59, 60, 61, and 62 from the light-source units 48a and 48b of the light-source device 31' by using the incident mirror 37 so that these light beams are aligned along the sub-scanning direction Z and are spaced each other. These light beams then pass through the cylinder lens 38 for emission of parallel light. Their light-beam width of the light beams 59, 60, 61 and 62 is then regulated by the aperture 130, and the light beams 59, 60, 61, and 62 from the light-source units 48a and 48b are then obliquely incident at different angles of incidence in the sub-scanning direction Z. With this, the light beams 59, 60, 61, and 62 from the light-source units 48a and 48b are collectively deflected and reflected, thereby causing the light beams 59, 60, 61, and 62 deflected and reflected on the deflection plane 95 to enter the fθ lens 116 as a scanning lens.

Then, the light beams 59, 60, 61, and 62 passing through the fθ lens 116 are separated by the toroidal lenses 117Y, 117M, 117C, and 117K to the respective colors, and are reflected by the folding mirrors 118 corresponding to the photosensitive drums 8Y, 8M, 8C, and 8K, thereby forming images each in a spot shape on the photosensitive drums 8Y, 8M, 8C, and 8K and forming electrostatic latent images based on image information.

In the embodiments explained above, the vibrating mirror 85 is provided as an optical deflecting unit. However, in the present embodiment, a polygon mirror generally used in a conventional optical scanning device may suffice. The optical deflecting unit in the present embodiment is therefore not restricted to a vibrating mirror.

Figure 36:
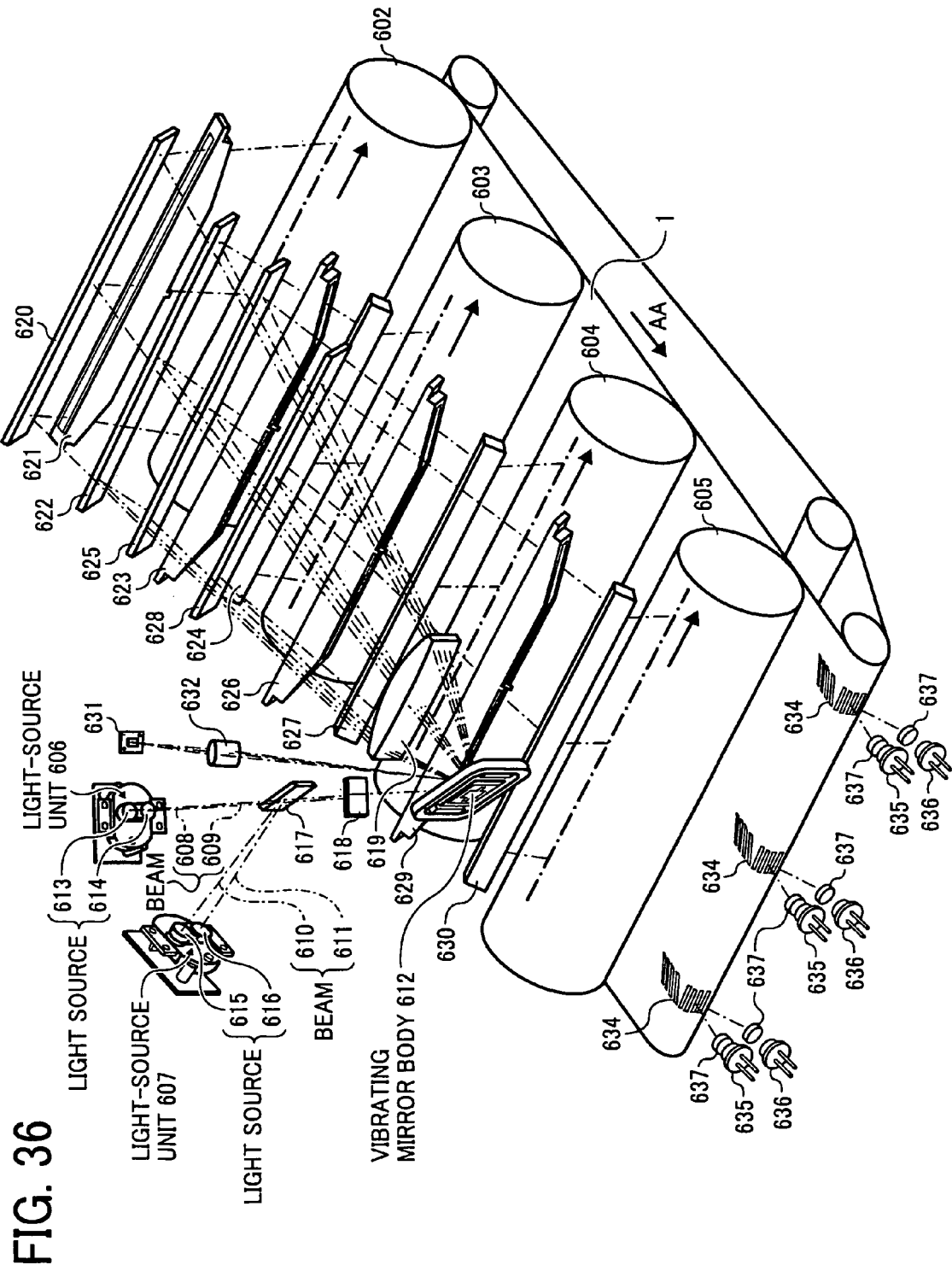
FIG. 36 is a perspective view of a schematic configuration of an electrophotographic image forming apparatus having incorporated therein an optical scanning device that scans four stations for image formation with a single vibrating mirror for explaining a fifth embodiment.
Figure 37:
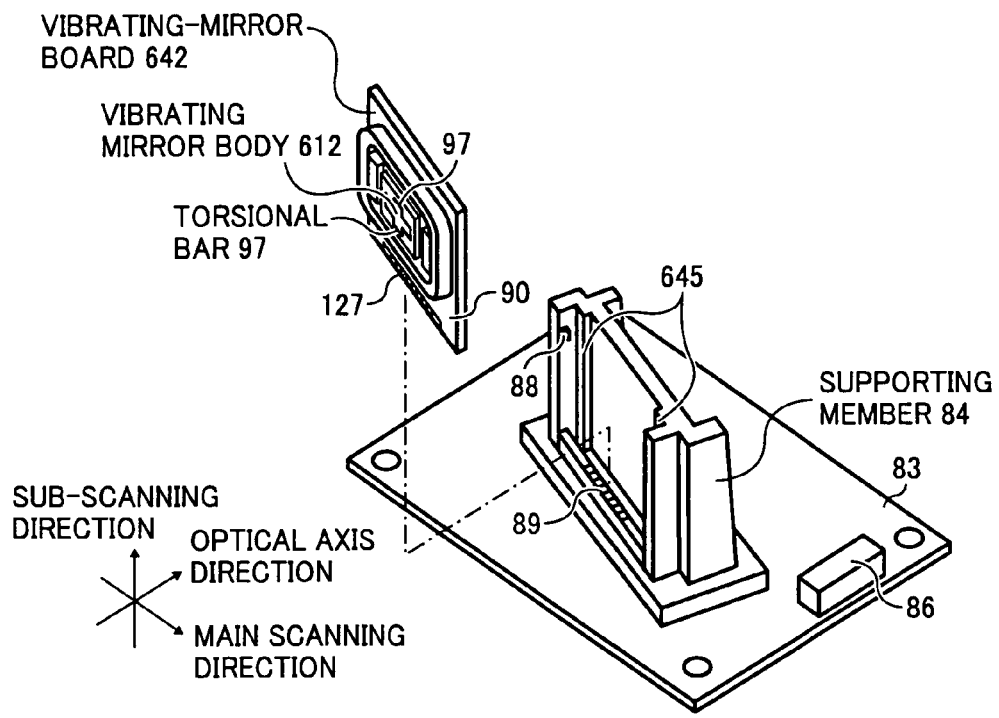
FIG. 37 is an exploded perspective view of a vibrating mirror portion in the fifth embodiment.

Next, a fifth embodiment of the present invention is explained with reference to the drawings. FIG. 36 is a perspective view of a schematic configuration of an electrophotographic image forming apparatus having incorporated therein an optical scanning device that scans four stations for image formation with a single vibrating mirror for explaining the fifth embodiment. FIG. 37 is an exploded perspective view of a vibrating mirror portion in the optical scanning device according to the present embodiment.

In the present embodiment as depicted, the optical scanning device that scans each photosensitive drum of four stations is integrally configured.

That is, for four photosensitive drums 602 to 605 arranged so as to be equally spaced along a moving direction AA of a transfer belt 1, beams 608 to 611 emitted from the corresponding light-source units 606 and 607 are separated after deflection by a vibrating mirror body 612 for incidence, thereby simultaneously forming latent images on the photosensitive drums 602 to 605. The vibrating mirror body 612 is assume to be a component including the components of the vibrating mirror 85 depicted in FIG. 4 except components, such as the implementation board 90.

Onto the vibrating mirror body 612, the beams 608 to 611 from the light-source units 606 and 607 are obliquely incident at different angles of incidence in the sub-scanning direction. With this, the beams 608 to 611 from the light-source units 606 and 607 are collectively deflected for scanning.

The light-source units 606 and 607 are provided, for two stations, with light sources 613 and 614 and light sources 615 and 616, respectively, arranged in the sub-scanning direction and integrally supported so that the beams 608 to 611 from the light sources 613 to 616 are adjusted to form 2.5 degrees in the present example so as to cross each other on the deflection plane of the vibrating mirror body 612.

In the present embodiment, the light-source unit 606 is disposed with its optical emitting axis being inclined downward at 1.25 degrees with respect to a main scanning plane, so as to make the beam 609 from the lower light source 614 parallel to the light-emitting axis of the light-source unit 606 and the beam 608 from the upper light source 613 inclined at 2.5 degrees. The other light-source unit 607 is disposed with its optical emitting axis being inclined upward at 1.25 degrees with respect to the main scanning plane, so as to make the beam 610 from the upper light source 615 parallel to the light-emitting axis and the beam 611 from the lower light source 616 inclined at 2.5 degrees. Also, the light-source units 606 and 607 are disposed with their installation heights being varied in the sub-scanning direction, so that the light emitting axes of the light-source units 606 and 607 cross each other in the sub-scanning direction on the deflection plane of the vibrating mirror body 612.

The other light-source unit 607 is disposed at a position lower than the other light-source unit 606 in the sub-scanning direction. With the incident mirror 617, the beams 608 to 611 from the light sources 613 to 616 are incident onto the cylinder lens 618 so as to be aligned in a vertical line with their heights being varied in the sub-scanning direction, so that the angle of incidence in the main scanning direction with respect to the normal to the vibrating mirror body 612 is 22.5 each ($=\alpha/2+\theta_d$) (where a deflection angle of the vibrating mirror body 612 is $\theta_d$ and an angle formed by the optical axis of each of the beams 608 to 611 incident from the light sources 613 to 616 onto the vibrating mirror body 612 and an optical axis of the optical system is $\alpha$) and also the beams cross each other on the vibrating mirror body 612 in the sub-scanning direction.

The beams 608 to 611 are converged near the deflection plane of the vibrating mirror body 612 in the sub-scanning direction by the cylinder lens 618. After deflection, these beams enter the fθ lens 116 with their space being widened so as to be separated from each other. The fθ lens 116 is shared among all stations, and does not have a converging force in the sub-scanning direction.

Of the beams 608 to 611 from the light-source units 606 and 607 passing through the fθ lens 116, the lower-stage beam 611 from the other light-source unit 607 is reflected on the folding mirror 620, converging as light in a spot shape on the photosensitive drum 602 via the toroidal lens 621, thereby forming a latent image based on image information of yellow color as a first image forming station.

The upper-stage beam 610 from the light-source unit 607 is reflected on the folding mirror 622, converging as light in a spot shape on the photosensitive drum 603 via the toroidal lens 623 and the folding mirror 624, thereby forming a latent image based on image information of magenta color as a second image forming station.

The lower-stage beam 609 from the other light-source unit 606 is reflected on the folding mirror 625, converging as light in a spot shape on the photosensitive drum 604 via the toroidal lens 626 and the folding mirror 627, thereby forming a latent image based on image information of cyan color as a third image forming station.

The upper-stage beam 608 from the light-source unit 606 is reflected on the folding mirror 628, converging as light in a spot shape on the photosensitive drum 605 via the toroidal lens 629 and the folding mirror 630, thereby forming a latent image based on image information of black color as a fourth image forming station.

Also, to a synchronization detection sensor 631, a light beam deflected on the vibrating mirror body 612 passes the side of the fθ lens 116 to be light-gathered by an image-forming lens 632 for incidence. Based on a detection signal, a synchronization detection signal is generated for each station.

Conventionally, a relation between the angle of incidence $\alpha$ from the light-source unit 606 and 607 to the vibrating mirror body 612 and an amplitude $\theta_0$ of the vibrating mirror body 612 is $\alpha > 2\theta_0$, and a maximum deflection angle $2\theta_{max} = \alpha + 2\theta_0$. To suppress an effective scanning ratio ($\theta_d/\theta_0$) to be equal to or smaller than a predetermined value, that is, in the present example, equal to or smaller than 0.6, as depicted in FIG. 38, an average angle of incidence $\alpha$ of the beam 608 to 611 from the light sources 613 to 616 is set so that, relations $\theta_0 \geq 2 \geq \theta_d$ and $\theta_0 \geq \theta_s > \theta_d$ hold.

Here, $\theta_d$ is a mirror effective deflection angle for scanning on a photosensitive member, and $\theta_s$ is a mirror deflection angle at the time of synchronization detection. Specifically, in the present example, $\theta_0 = 25$ degrees, $\theta_d = 15$ degrees, $\alpha = 45$ degrees, and $\theta_s = 18$ degrees.

The synchronization detection sensor 631 may be disposed so that $\theta_s \geq \alpha/2$ holds.

Figure 38:
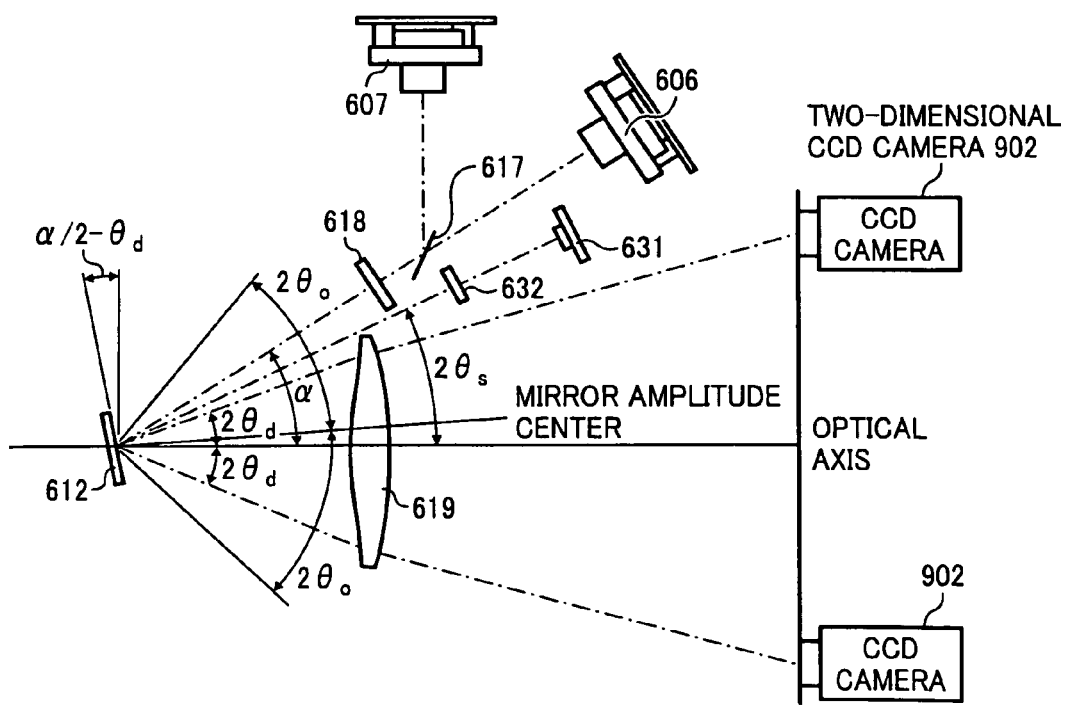
FIG. 38 is a drawing for explaining a relation between, for example, the vibrating mirror and a beam, in the fifth embodiment.

In FIG. 38, the example is depicted in which the center of the mirror amplitude does not coincide with the optical axis of an fθ lens 619, that is, the center of the mirror amplitude is shifted to the side of the light sources 613 to 616 for vibration. In this configuration, the center of the mirror amplitude coincides with the optical axis of the fθ lens 619, and the planes of the fθ lens 619 and the toroidal lenses 621, 623, 626, and 629 are in a curved shape symmetrical along the main scanning direction.

As explained above, the deflection plane of the vibrating mirror body 612 is deformed to be wavy according to reciprocating vibrations. This amount of deformation δ is maximum with an amplitude $\theta_0$, and the amount of change tends to increase in proportion to a change from the deflection angle 0 to $\theta_0$.

That is, the deflection angle $\theta_d$ for scanning a scanning area is defined by an angle of view of the fθ lens 619. Therefore, a smaller ratio of the deflection angle $\theta_d$ for scanning the scanning area with respect to the amplitude $\theta_0$, that is, a smaller effective scanning ratio ($\theta_d/\theta_0$), is susceptible to the influence of mirror deformation.

However, there is a contradictory relation in which, to increase the amplitude $\theta_0$, the mass of the mirror board of the vibrating mirror body 612 has to be decreased and, conversely, if the thickness of the mirror board is decreased, the amount of deformation is increased.

In the present embodiment, the effective scanning ratio ($\theta_d/\theta_0$) is set within a range of the deflection angle with an angular velocity of the vibrating mirror being relatively constant, and the deflection angle $\theta_d$ for scanning the scanned area is made 60% or smaller of the amplitude ratio $\theta_0$, thereby suppressing deformation.

A roller portion of a recording-medium exit of a transfer belt 601 has disposed thereat a detecting unit for detecting superposition accuracy for images of respective colors formed and superposed at the respective stations. This detecting unit reads a detection pattern 634 of the toner image formed on the transfer belt 601 and detects a main-scanning registration and a sub-scanning registration each as a shift from a reference station, thereby regularly performing correction control.

In the present embodiment, the detecting unit includes an light-emitting diode (LED) element for lighting 635, a photosensor 636 receiving reflected light, and paired light-gathering lenses 637, and is provided at three positions, that is, at right and left ends and center of an image, thereby reading a detection time difference from that of black, which is a reference color, according to the movement of the transfer belt 1.

A configuration example as depicted in FIG. 37 is explained in which the vibrating-mirror module according to the present embodiment adopts an electromagnetic driving scheme for a rotary-torque generating structure of the vibrating mirror body 612.

As depicted in the drawing, the vibrating mirror body 612 is pivotally supported by the torsional bar 97. As with the case of the deflecting unit 39 depicted in FIG. 6, the vibrating mirror body 612 is manufactured by piercing an outer shape through etching from out of a single Si board, and is mounted on the implementation board 90, thereby configuring a vibrating-mirror board 642. In this example, paired vibrating-mirror boards 642 are laminated back to back to from an integrally-supported module. This vibrating-mirror module is different from the deflecting unit 39 depicted in FIG. 6 in that the vibrating-mirror boards 642 are included. Components identical in configuration to those of the deflecting unit 39 are provided with the same reference numerals, and are not explained herein.

Figure 39:
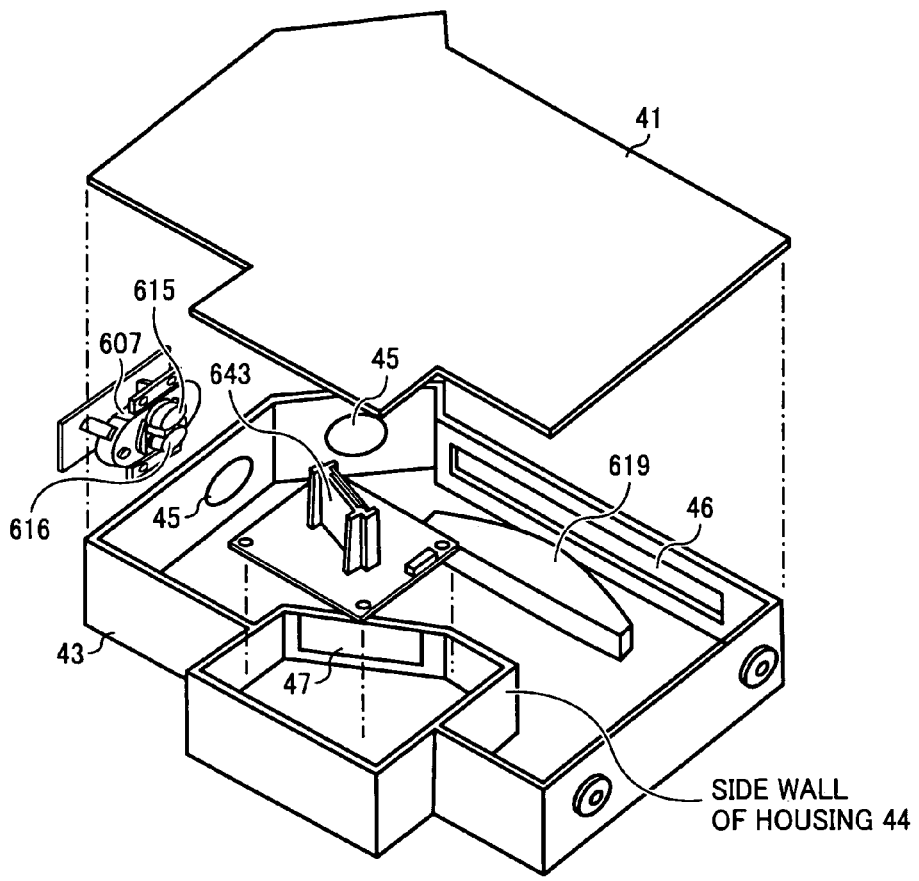
FIG. 39 is an exploded perspective view of the configuration of a housing and a vibrating mirror module in the fifth embodiment.

The vibrating-mirror module configured above is mounted on an optical housing 653, as an exploded perspective view depicted in FIG. 39. However, the optical housing 653 is different from the optical housing 35 depicted in FIG. 5 in that the optical housing 653 has a plurality of fitting holes 45. For explanation of each configuration of the optical housing 653, the same reference numerals are provided and redundant explanation is omitted herein.

Figure 40:
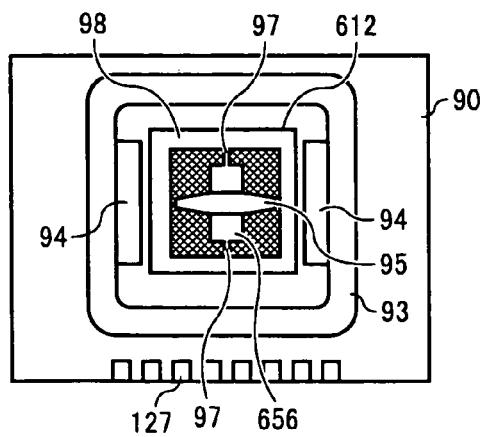
FIG. 40 is a front view of a vibrating mirror board in the fifth embodiment.
Figure 41:
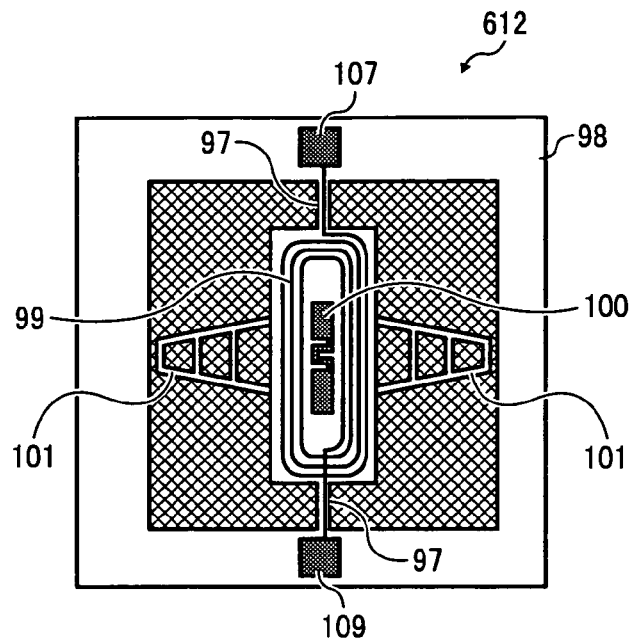
FIG. 41 is a rear view of the vibrating mirror in the fifth embodiment.

Next, with reference to FIGS. 40 and 41, the configuration of the vibrating mirror is explained in detail. FIG. 40 is a front view of the vibrating mirror board. FIG. 41 is a rear view of the vibrating mirror. In the following explanation, component identical in configuration to those of the vibrating mirror depicted in FIGS. 7 and 8 are provided with the same reference numerals, and are not explained herein. Also, a side view of the vibrating mirror and exploded perspective views of the vibrating mirror board and the vibrating mirror are identical to those in FIGS. 9 and 10.

The vibrating mirror body 612 depicted in FIGS. 40 and 41 includes a movable unit having formed on its surface a mirror surface and serving as a vibrator, the torsional bar 97 supporting the movable unit and serving as a rotational axis, and a frame 98 serving as a supporting unit, and is formed by cutting an Si board through etching. In the present embodiment, a wafer called Silicon On Insulator (SOI) board is used for manufacturing, in which two boards having 60 micrometers and 140 micrometers, respectively, are previously bonded with an oxide film being interposed therebetween.

The vibrating mirror body 612 is mounted on the seat 92 with the front of the deflection plane 95 upward. With a current flowing across the terminals 107, a Lorentz force occurs at each side parallel to the rotational axis of the flat coil 99, thereby causing the torsional bar 97 to be twisted to cause a rotary torque T for rotating the vibrating mirror body 612. When the current is cut out, with the resilience of the torsional bar 97, the vibrating mirror body 612 returns to be horizontal.

Therefore, by alternately switching the direction of the current flowing through the flat coil 99, the movable mirror 102 (depicted in FIGS. 7 and 10) can be vibrated in a reciprocating manner. Also, when the cycle of switching the current is set to be approximately at a unique frequency of a primary vibrating mode of the structure configuring the vibrating mirror body 612 with the torsional bar 97 being taken as a rotating axis, that is, a so-called resonant frequency $f_0$, the amplitude is excited to obtain a large deflection angle.

Therefore, normally, the scanning frequency $f_d$ is controlled to be set so as to coincide with or follow the resonant frequency $f_0$. However, as explained above, since the resonant frequency $f_0$ is determined by the moment of inertia I of the vibrator forming the vibrating mirror body 612, if there are variations in dimensional accuracy in finishing, a difference occurs among each product. Therefore, in the case of using a plurality of vibrating mirrors 612, it is difficult to coincide the scanning frequencies $f_d$ each other.

Although such variations in resonant frequency $f_0$ are on the order of ±200 hertz, depending on process capability. For example, if the scanning frequency $f_d$=2 kilohertz, a shift occurs in scanning line pitch equivalent to a $1/10$ line. When an A4 size is output, a shift in magnification as large as several tens of millimeters at the final end.

Although selection can be made by combining those having a resonant frequency close to the resonant frequency $f_0$, production efficiency is not satisfactory. Moreover, replacement has to be made always as a pair, thereby increasing cost.

To get around this problem, in the case of using a plurality of vibrating mirrors 612, before mounting on the implementation board 90, an incision is made on the patch 108 formed on the rear side of the movable unit by using a carbon-dioxide laser or the like to gradually reduce the mass of the movable unit, thereby adjusting the moment of inertia I. Also, even if the difference of dimension between products, the resonant frequencies $f_0$ are adjusted to be within a range of ±50 hertz so as to be approximately identical to each other. Within the frequency band, the scanning frequency $f_d$ is set irrespectively of the resonant frequency $f_0$.

Figure 42:
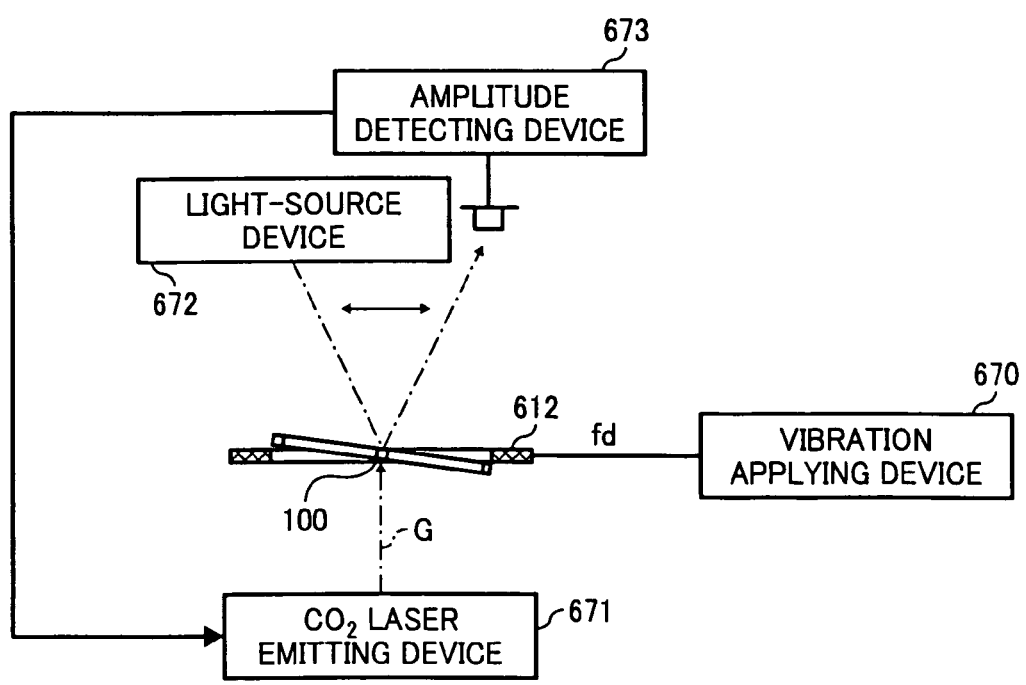
FIG. 42 is a drawing for explaining adjustment of a resonant frequency with mass variation (trimming) in the vibrating mirror in the fifth embodiment.

FIG. 42 is a drawing for explaining adjustment of the resonant frequency with mass variation (trimming) in the vibrating mirror. To the vibrating mirror body 612, a vibration corresponding to the scanning frequency is given by a vibration applying device 670. From the rear side of the vibrating mirror body 612, the patch 108 is radiated with a carbon dioxide gas laser G from a $CO_2$ laser emitting device 671, thereby making an incision until the deflection angle is abruptly increased with resonance.

A resonant state can be detected by emitting a beam from the light-source device 672 onto the front side of the vibrating mirror body 612 and detecting a vibration of the reflected beam by an amplitude detecting device 673.

In place of such an amount-reducing-type trimming scheme, an amount-increasing-type scheme by applying a balance weight may be used.

Figure 43:
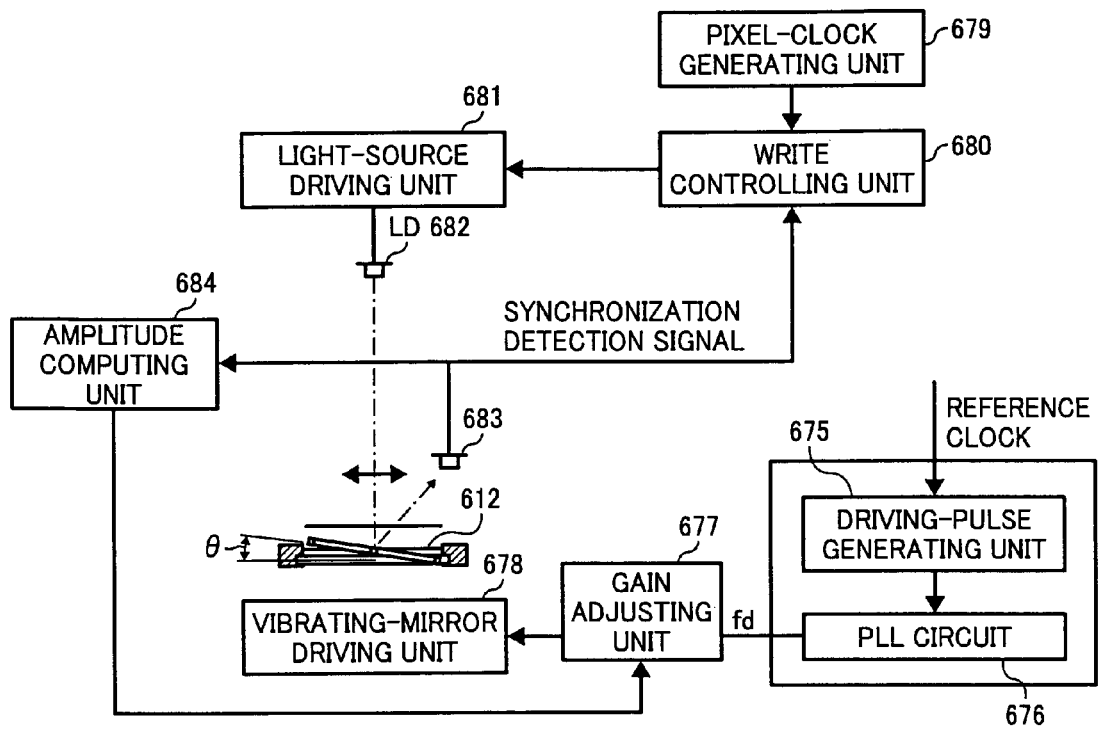
FIG. 43 is a block diagram of the configuration of a driving circuit that causes the vibrating mirror to vibrate in the fifth embodiment.

FIG. 43 is a block diagram of the configuration of a driving circuit that causes the vibrating mirror to vibrate in the present embodiment, in which the scanning frequency $f_d$ is set by a driving-pulse generating unit 675 and a phase-locked loop (PLL) circuit 676 and a driving signal is then output via a gain adjusting unit 677 to a movable mirror driving unit 678. With this driving signal, an alternating voltage or pulse-wave voltage is applied to the flat coil 99 formed on the rear side of the vibrating mirror body 612 so that the current flowing direction is alternately switched. Also, the current flowing through the flat coil 99 is adjusted so that the deflection angle θ is constant, thereby causing the vibrating mirror body 612 to vibrate in a reciprocating manner.

The state of the vibrating mirror body 612 is detected by the synchronization detecting sensor 683 receiving reflected light of light emitted toward the vibrating mirror body 612 from the light source (LD) 682 driven and controlled by a pixel-clock generating unit 679, a write controlling unit 680, a light-source driving unit 681, and others. The detection signal is then corrected and processed at an amplitude computing unit 684, and then the corrected driving signal is output to the vibrating-mirror driving unit 678, thereby controlling in a manner so that the deflection angle θ is constant.

Figure 44:
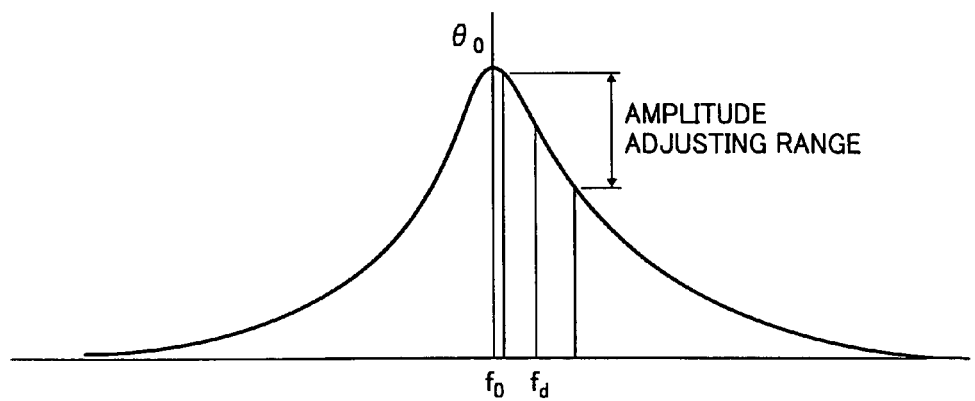
FIG. 44 is a drawing of a relation between a frequency f and a deflection angle θ for switching a current flowing direction in a flat coil in the fifth embodiment.

FIG. 44 is a drawing of a relation between a frequency f for switching the current flowing direction and the deflection angle θ in a flat coil. In general, the flat coil shows a frequency characteristic with the resonant frequency $f_0$ as a peak. If the frequency $f_d$ coincides with the resonant frequency $f_0$, the largest deflection angle can be achieved. However, near the resonant frequency, the deflection angle is abruptly changed.

Therefore, initially, the driving frequency applied to the driving controlling unit of the vibrating mirror body 612 can be set so as to coincide with the resonant frequency. However, when the resonant frequency is fluctuated due to, for example, a change in spring constant associated with a temperature change, the deflection angle is significantly decreased, thereby posing a problem of poor stability with time.

To get around this problem, in the present embodiment, the scanning frequency $f_d$ is fixed to a single frequency outside the resonant frequency $f_0$, and the deflection angle θ can be increased and decreased according to gain adjustment. Specifically, for the resonant frequency $f_0$=2 kilohertz, the scanning frequency $f_d$ is set at 2.5 kilohertz so that the deflection angle θ is ±25 degrees through gain adjustment.

In view of variation with time, the light beam for scanning by the vibrating mirror body 612 is detected at a synchronization detection sensor 683 disposed at a start end of a scanning area, based on a time difference between a detection signal for detection at the time of return scanning and a detection signal for detection at the time of forward scanning, thereby controlling so that the deflection angle θ is constant.

Figure 45:
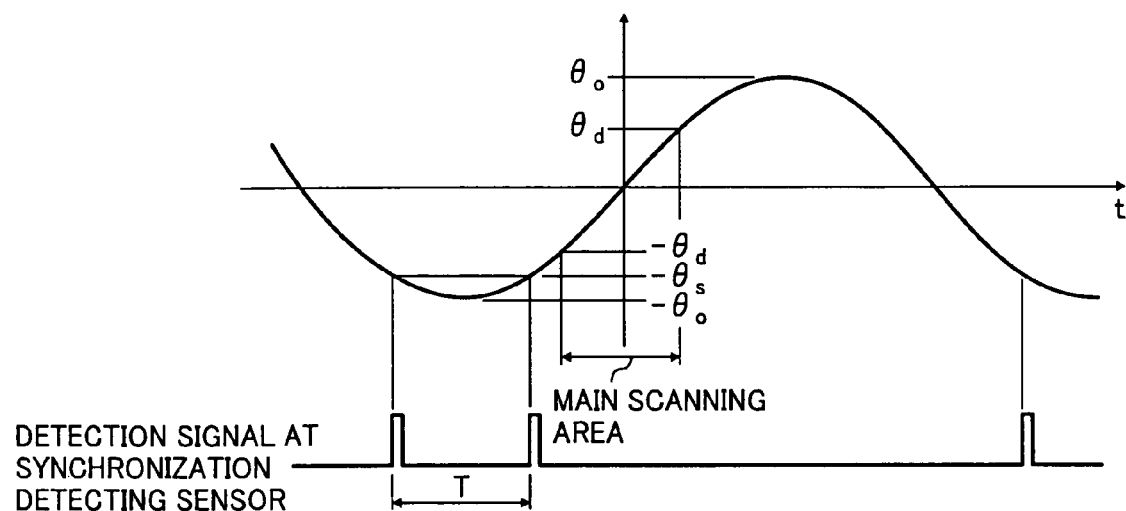
FIG. 45 is a drawing for explaining that a scanning angle θ is varied in a sine wave with time t due to resonance of the vibrating mirror in the fifth embodiment.

As depicted in FIG. 45, the vibrating mirror body 612 has the scanning angle θ changed in a sine wave form with a time t due to resonance and vibration.

Therefore, when a maximum deflection angle (amplitude) of the vibrating mirror body 612 is $θ_0$, $θ=θ_0 \cdot \sin 2πf_d t$. When a beam with a scanning angle corresponding to $2θ_s$ is detected by the synchronization detection sensor 683, detection signals occur in return scanning and forward scanning and, by using a time difference T therebetween, $θ_s=θ_0 \cdot \cos 2πf_d \cdot T/2$ holds. Since $θ_s$ is fixed, the maximum deflection angle $θ_0$ can be detected by measuring the time difference T.

During a period from beam detection in return scanning to beam detection in forward scanning, that is, during a period where $θ_0 > θ > θ_s$ holds for the deflection angle of the vibrating mirror body 612, light emission is prohibited at the light sources 613 to 616.

On the photosensitive drum surface as a scanned surface, main-scanning dots have to be formed so that spaces between pixels are uniform with respect to time.

Figure 46:
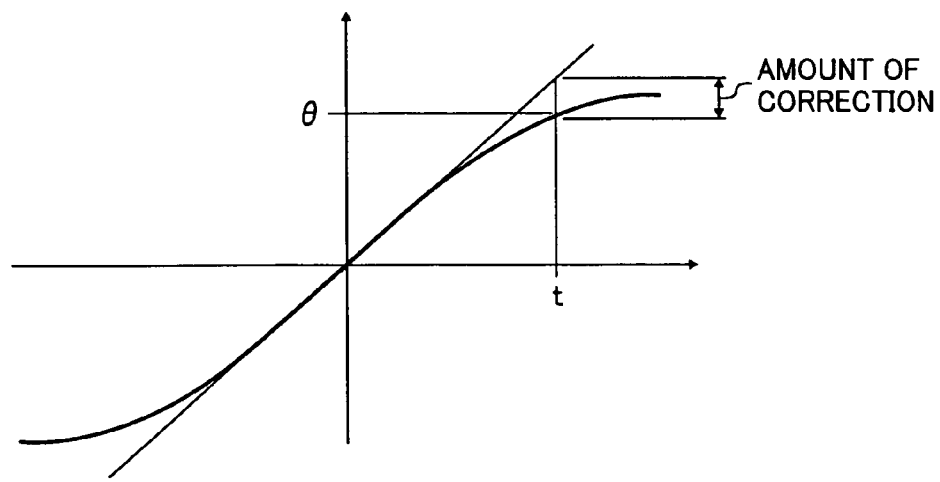
FIG. 46 is a drawing for explaining the deflection angle θ of the vibrating mirror varied with time, in the fifth embodiment.

However, in the vibrating mirror body 612, as depicted in FIG. 46, a change ratio of the deflection angle θ is decreased with time in an accelerated manner. Therefore, on the scanned plane, the pixel space is narrower in a portion closer to any one of both ends of the main scanning area.

In general, this shift is corrected by using f·arcsin lens as the fθ lens 619. As with scanning at a polygon mirror, when a pixel clock is modulated with a single frequency, if the scanning angle 2θ is proportional to time, that is, if the scanning angle 2θ is to be changed with uniform velocity, power along the main scanning direction (refracting power) has to be set so that the amount of correction at a main scanning direction is maximum at an end of the main scanning area.

At this time, when an image height is 0, that is, when a time from the center of an image to an arbitrary image height H is t, a relation between the image height H and the deflection angle θ (scanning angle 2θ) is such that $H=ω \cdot t=(ω/2πf_d) \cdot \sin^{-1}(θ/θ_0)$, where ω is a constant.

However, when dilatation of pixel spaces, that is, so-called linearity correction amount, is increased, a deviation in power along the main scanning direction of the fθ lens 619 is increased, thereby increasing a change in beam spot size corresponding to each pixel on the scanned plane. Also, as explained above, with the amplitude center of the vibrating mirror body 612 not coinciding with the optical axis thereof, an fθ lens having a curved plane asymmetric to the optical axis is required. Therefore, in the present embodiment, a phase Δt of a pixel clock is varied according to the main scanning direction, thereby decreasing a deviation in power of the fθ lens along the main scanning direction and correcting an asymmetric component.

Now, when a change in scanning angle associated with the phase Δt of the pixel clock being varied is represented by 2Δt, relational expressions are $H=(ω/2πf_d) \cdot \sin^{-1}\{(θ-Δθ)/θ_0)\}$, and $Δθ/θ_0=\sin 2πf_d t - \sin 2πf_d(t-Δt)$.

When power distribution to the fθ lens 619 is similar to that to an fθ lens 619 and the residual is corrected with the phase Δt of the pixel clock, the light source can be changed so that the following relational expressions hold $H=(ω/2πf_d) \cdot \{(θ-Δθ)/θ_0)\}=(ω/2πf_d) \cdot \sin^{-1}(θ/θ_0)$, and $Δθ/θ_0=θ/θ_0-\sin^{-1}(θ/θ_0)$, and a phase Δt (sec) of a predetermined pixel along the main scanning direction is determined based on a relational expression of $(θ/θ_0)-\sin^{-1}(θ/θ_0)=\sin 2πf_d t - \sin 2πf_d(t-Δt)$.

Figure 47:
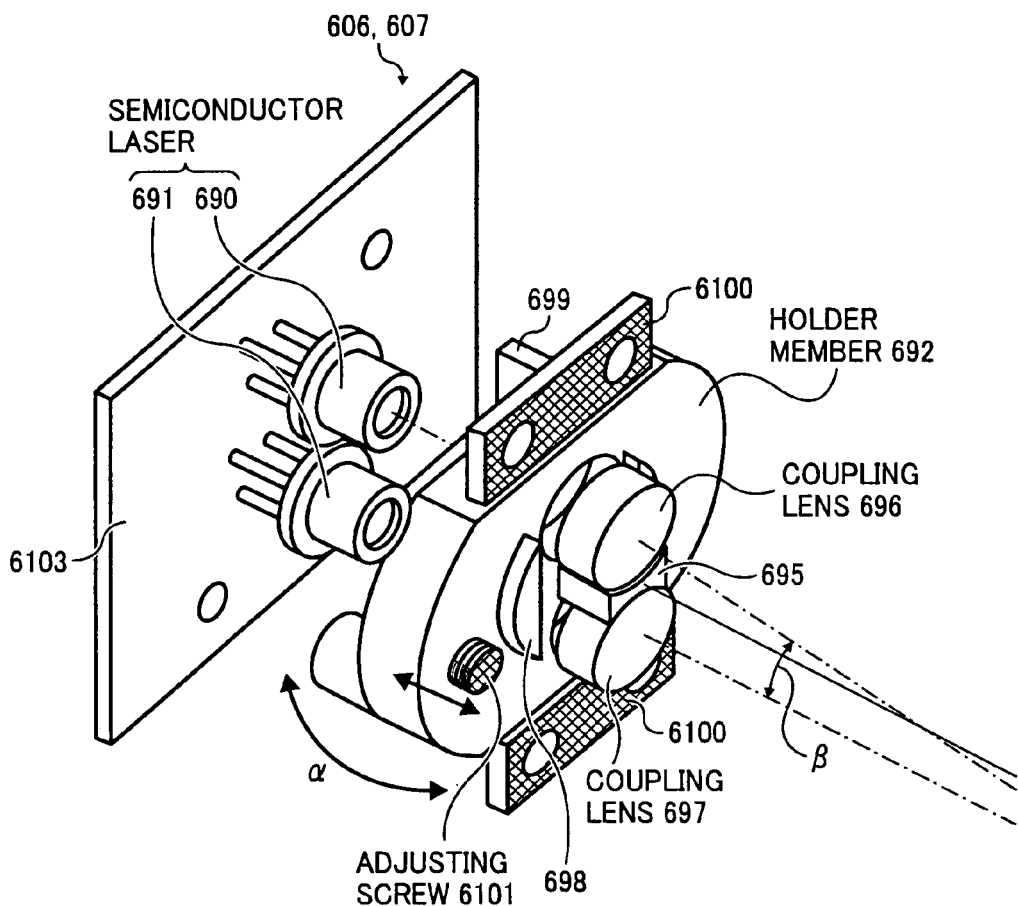
FIG. 47 is a perspective view of a light-source unit viewed from the front side, in the fifth embodiment.
Figure 48:
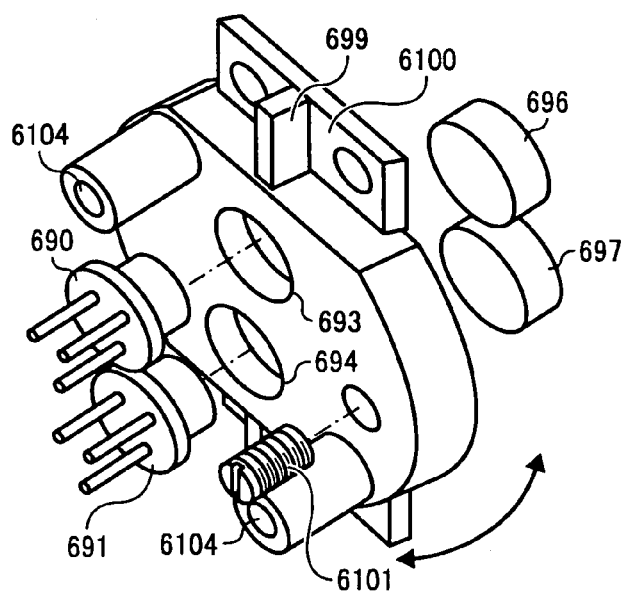
FIG. 48 is a perspective view of a light-source unit viewed from the rear side, in the fifth embodiment.

FIGS. 47 and 48 are perspective views of a light-source unit according to the present embodiment. FIG. 47 depicts a front side, whilst FIG. 48 depicts a rear side.

In the light-source units 606 and 607 depicted in FIGS. 36 and 37, for example, with the rotating direction being positioned along a stem outer perimeter, the semiconductor lasers 690 and 691 as the light sources 613 to 616 are pressed and fixed to fitting holes 693 and 694 formed on a holder member 692 as a holding member, from the rear side with reference to the stem outer perimeter.

Also, a protrusion 695 having a vertical U-shaped groove is positioned in an optical axis direction with a light-emitting point so that optical axes of coupling lenses 696 and 697 coincide with optical emitting axes of the semiconductor lasers 690 and 691, respectively, and also the emitted beam becomes a parallel light beam. Also, a space between the protrusion 695 and the coupling lenses 696 and 697 is filled with an UV adhesive, which is then hardened to be fixed.

The arrangement is such that the optical axis of the coupling lens 696 is slightly decentered so that a light beam from the semiconductor laser 690 crosses a light beam from the other semiconductor laser 691 at a crossing angle of 2.5 degrees.

In the light-source unit 606, with respect to the mounting surface of the optical housing 653 orthogonal to an optical emitting axis not shown, a cylindrical protrusion 698 formed on the holder member 692 is taken as a positioning reference. Mounting seat faces 6100 vertically connected together via a spindle 699 are integrally formed with the holder member 692, abutting on the mounting surface of the optical housing 653 for screw fixing.

Also, one end of the holder member 692 in the main scanning direction is screwed with an adjusting screw 6101, which is a beam-incident-position adjusting unit and also a light-source-angle adjusting member. With a tip abutting on the mounting surface of the optical housing 653, the holder member 692 is elastically deformed according to the amount of protrusion with the spindle 699 being taken as a rotating axis, thereby adjusting the inclination in an arrow direction (a direction). Thus, the main scanning direction of the beam incident onto the deflection plane of the vibrating mirror body 612 can be corrected.

At this time, the inclination (angle) of the holder member 692 is adjusted in a manner such that, as depicted in FIG. 38, a sensor, for example, a two-dimensional charge-coupled device (CCD) camera 902, is placed at each of both ends of a scanning area so that beam spot sizes in the main scanning direction coincide with each other.

On the rear side of the holder member 692, the semiconductor lasers 690 and 691 are lead-connected, and a supporting unit 6104 that supports the printed board 6103 on which a driving circuit is formed is provided. Also, a light source, a coupling lens, and a driving circuit board for the light source corresponding to two stations for image formation depicted in FIG. 36 are integrally formed.

Figure 49:
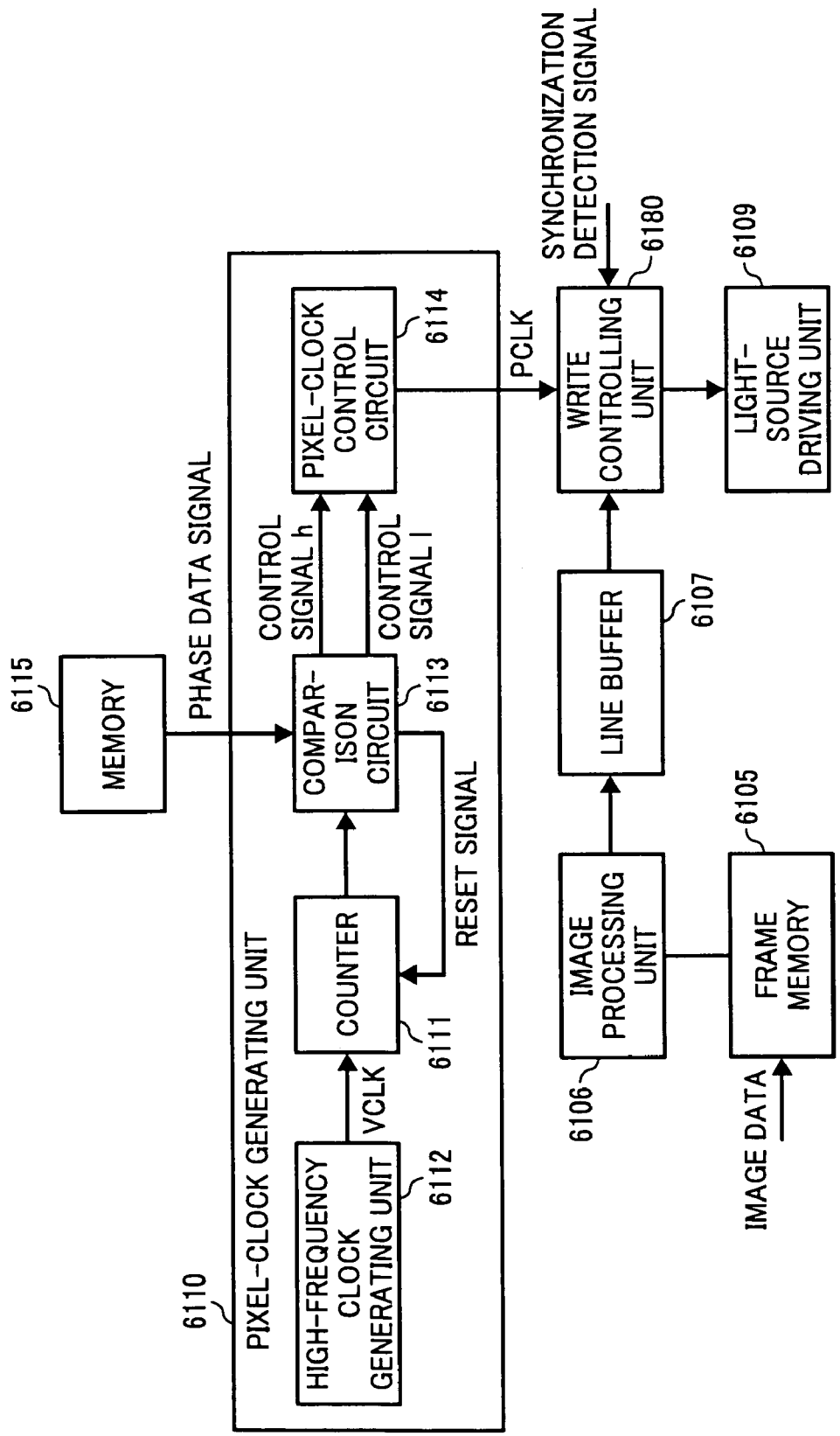
FIG. 49 is a block diagram of the configuration of a driving circuit that modulates a semiconductor laser serving as a light source in the fifth embodiment.

FIG. 49 is a block diagram of the configuration of the driving circuit that modulates the semiconductor laser serving as a light source in the present embodiment.

Image data raster-developed for each color is temporarily stored in a frame memory 6105, and is sequentially read to an image processing unit 6106. With this, pixel data for each line is formed according to a matrix pattern corresponding to an intermediate tone with reference to relations prior to and subsequent to the data, and is transferred to a line buffer 6107 corresponding to the light sources 613 to 616 (690 and 691). A write controlling unit 6108 performs reading from the line buffer 6107 with a synchronization detection signal as a trigger, thereby individually modulating each light-source driving unit 6109.

Next, a pixel-clock generating unit 6110 that modulates each light-emitting point is explained. In a counter 6111, a high-frequency clock VCLK generated in a high-frequency clock generating unit 6112 is counted. In a comparison circuit 6113, the count value, a setting value L previously set based on a duty ratio, and a phase data signal H given from an external memory 6115 as a transition timing of a pixel clock and indicating the amount of phase shift are compared. When the count value coincides with the setting value L, a control signal h indicating the trailing of a pixel clock PCLK is output. At this time, the counter 6111 is reset simultaneously with the control signal h to count again from zero, thereby forming a successive pulse string.

In this manner, in a pixel-clock control circuit 6114, a phase data H is given for each clock, and the pixel clock PCLK with a pulse period being varied is generated for output to a write controlling unit 6108. In the present embodiment, the pixel clock PCLK is assumed to be eight-frequency divisions, and the phase can be varied with a resolution of a ⅛ clock.

Figure 50:
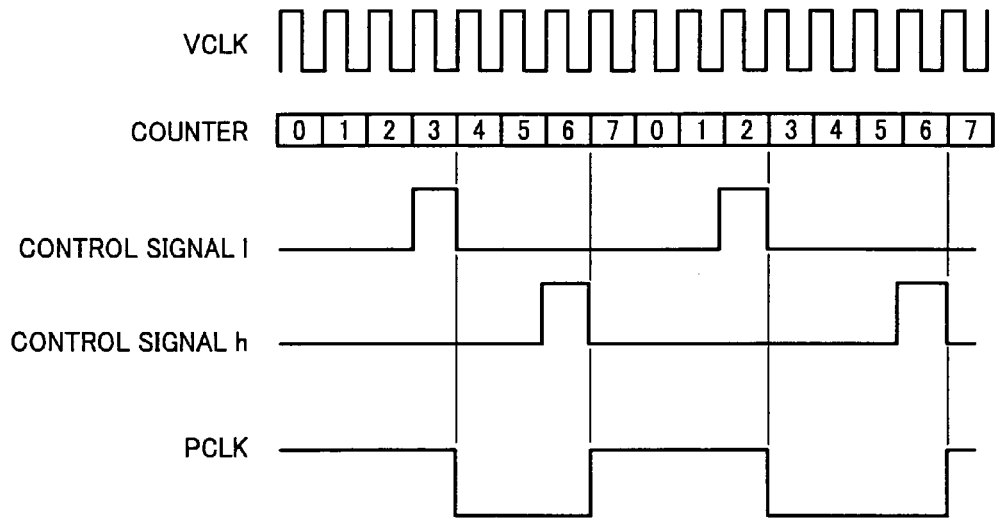
FIG. 50 is a drawing for explaining the case where the phase of an arbitrary pixel is shifted in a pixel clock generating unit in the fifth embodiment.

FIG. 50 is a drawing for explaining the case where the phase of an arbitrary pixel is shifted in a pixel clock generating unit and the example in the case where the phase is delayed by ⅛ clock;

Assuming that the duty is 50%, the set value L=3 is given, and counting up to four is conducted by the counter 6111, so that a pixel clock PCLK is lowered. When delay of ⅛ clock phase is caused, phase data H=6 is given, so that the pixel clock is raised at seven counts. Simultaneously therewith, since the counter is reset, the pixel clock is lowered at four counts again. That is, an adjacent pulse cycle is reduced by ⅛ clock.

The pixel clock PCLK thus produced is given to the light source driving unit 6109, and the light sources 613 to 616 (the semiconductor lasers 690 and 691) are driven according to modulated data obtained by superimposing pixel data read from the line buffer 6107 with respect to the pixel clock PCLK.

Figure 51:
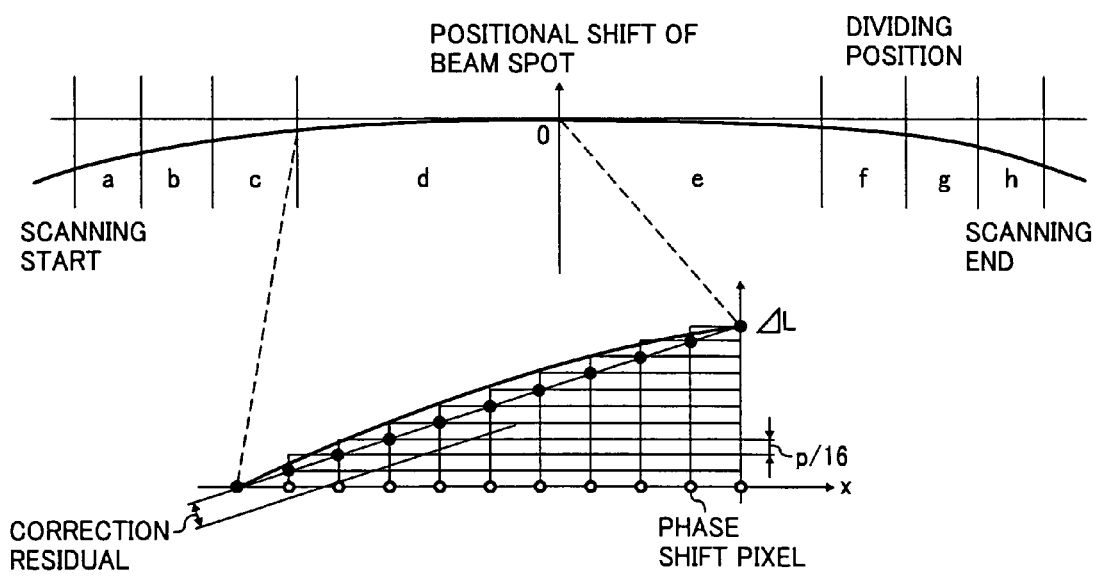
FIG. 51 is a drawing for explaining an amount of correction at a beam reaching position for each pixel according to a main scanning direction at the time of modulation with a single frequency in the fifth embodiment.

FIG. 51 is a drawing for explaining an amount of correction at a beam reaching position for each pixel according to the main scanning direction at the time of modulation with a single frequency. The main scanning area is divided into a plurality of areas (in this example, the main scanning area is divided into eight), and approximation is made with a line graph. With this, the number of phase shifts is set for each area so that a shift in main scanning direction is zero at each boundary, thereby achieving stepwise correction.

For example, when it is assumed that the number of pixels in an i area is Ni, the amount of shift at each pixel is a $\frac{1}{16}$ unit of a pixel pitch p, and a shift in main-scanning reaching position at both ends of each area is $\Delta Li$, $ni=Ni\cdot p/16\Delta Li$ holds. Thus, the phase is shifted for each ni pixels.

When the pixel clock is $f_c$, a phase difference $\Delta t$ in total is $\Delta t = 1/16 f_c \times f(Ni/ni)di$ by using the number of phase shifts Ni/ni. Similarly, a phase difference $\Delta t$ a pixel at an N-th dot can be set by using the accumulated number of times of previous phase shift.

The divided area width may be uniform or non-uniform, and also the number of divisions may be arbitrary. However, if the amount of shift at each pixel is increased, a step height tends to be conspicuous in the image. Therefore, the amount of shift is preferably a ¼ unit or smaller of the pixel pitch p. Conversely, if the amount of phase shift is decreased, the number of times of phase shift is increased, thereby increasing the memory capacity. Also, as the number of divisions is smaller, the required memory capacity is smaller. Therefore, it is efficient that the area width of an area with a large main-scanning reaching position is set to be small, whilst the area width of an area with a small main-scanning reaching position is large is set to be large.

Also, in general, an output from a semiconductor laser is detected by a sensor for a light-amount monitor mounted inside the same package as that of backlight before being applied to an image area for every scanning, thereby controlling the amount of current to be applied to the light source so that the output holds a constant value during recording one line.

Figure 52:
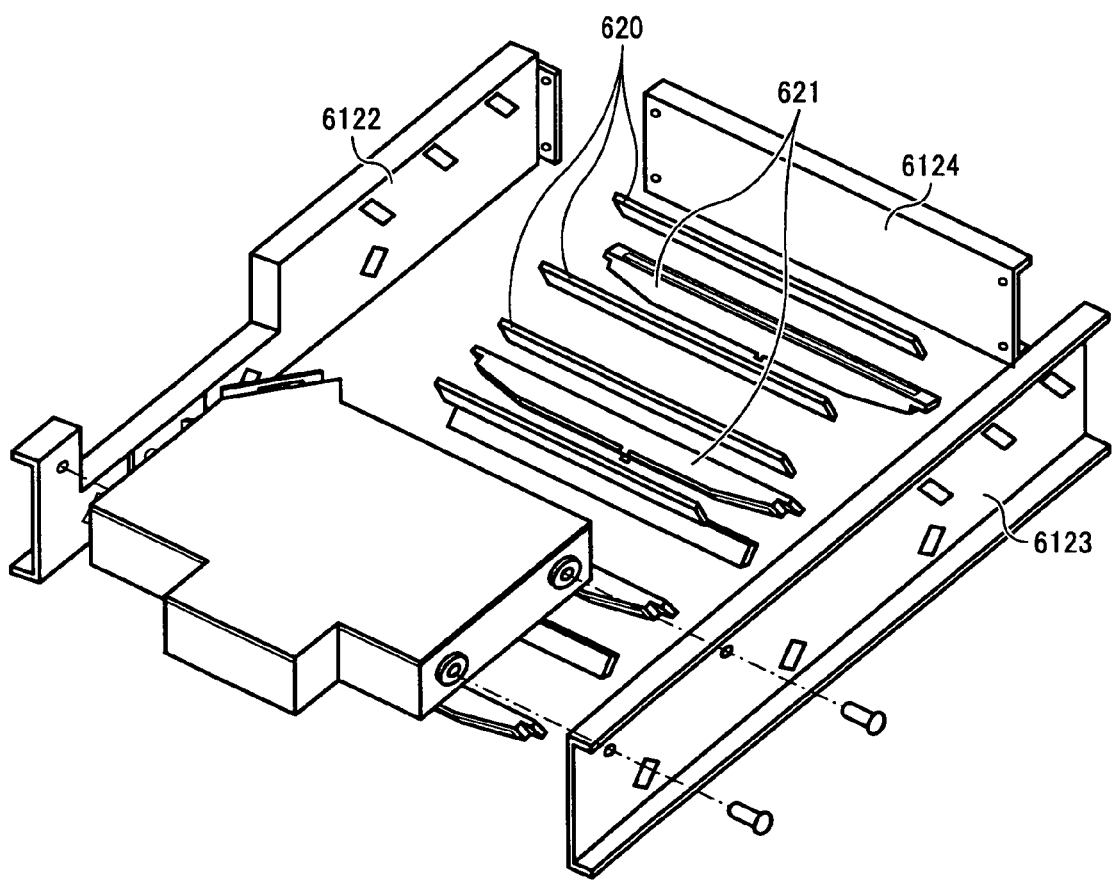
FIG. 52 is a perspective view of a housing portion including a folding-mirror support in the fifth embodiment.

FIG. 39 explained above is a perspective view of the optical housing 653 having accommodated therein components of the optical scanning device depicted in FIG. 36, the light-source units, the vibrating-mirror module, and the fθ lens. FIG. 52 is a perspective view of a housing portion including a folding-mirror support.

In FIG. 39, the light-source unit 607 (606) is mounted on the outside with reference to the fitting hole 45 provided on the side plate 43 of the optical housing 653 each molded of resin. With the optical housing 653, the supporting member 643 of the vibrating mirror body 612 is integrally formed. The vibrating mirror module is supported by a small room surrounded by the partition plates 44 including a flat transparent window 47. Also, the fθ lens 619 is adhered and fixed to the bottom surface. The optical housing 653 is sealed with an upper cover 41, and a beam is emitted through an emission window 46.

Thus assembled optical housing 653 is fixed with screws, as depicted in FIG. 52, so as to be sandwiched by side plates 6122 and 6123 formed of sheet metal, with the folding mirror 620 (622, 624, 625, 627, 628) and the toroidal lens 621 (623, 626, 629) being cross-linked into rectangular holes formed on the side plates for supporting. In the drawing, 6124 represents a supporting plate.

Figure 53:
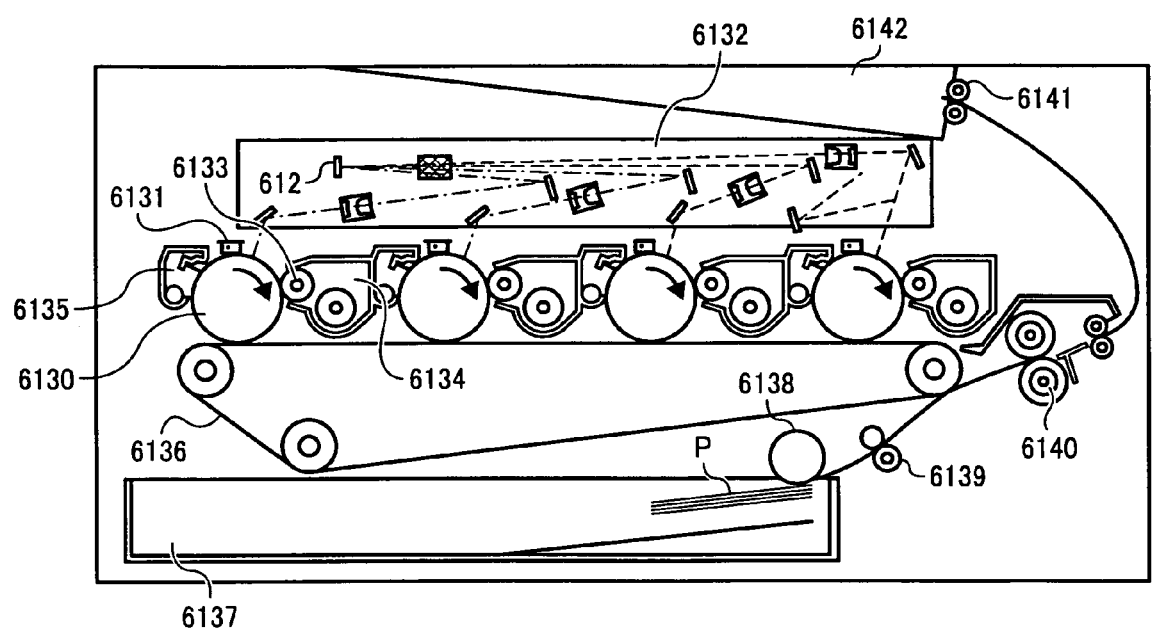
FIG. 53 is a configuration diagram of an embodiment of an image forming apparatus having incorporated therein the light-source device and the optical scanning device in the fifth embodiment.
Figure 54:
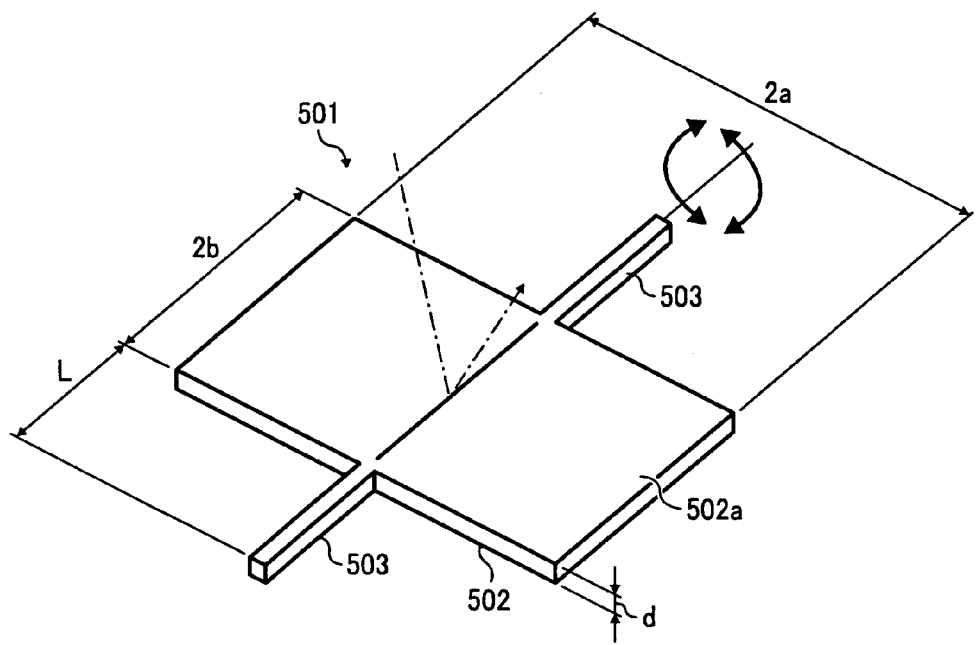
FIG. 54 is a perspective view of a conventional vibrating mirror and others.
Figure 55:
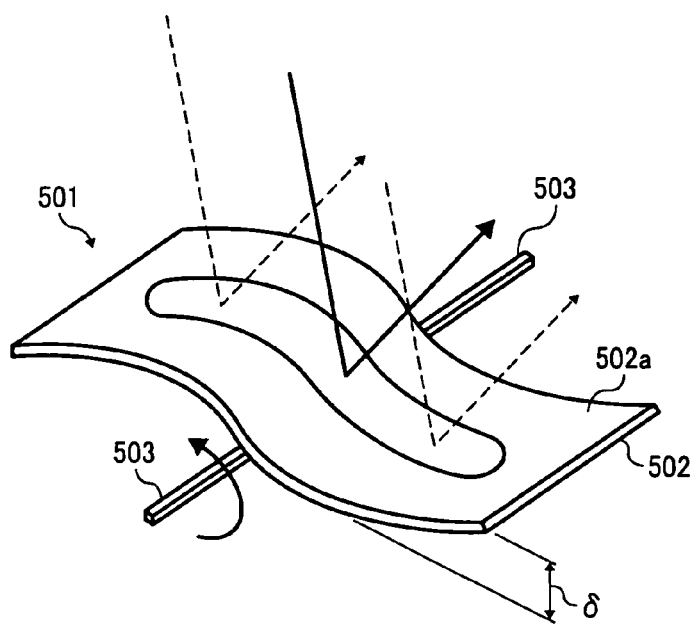
FIG. 55 is a perspective view of the state where the vibrating mirror depicted in FIG. 54 is undulated.
Figure 56:
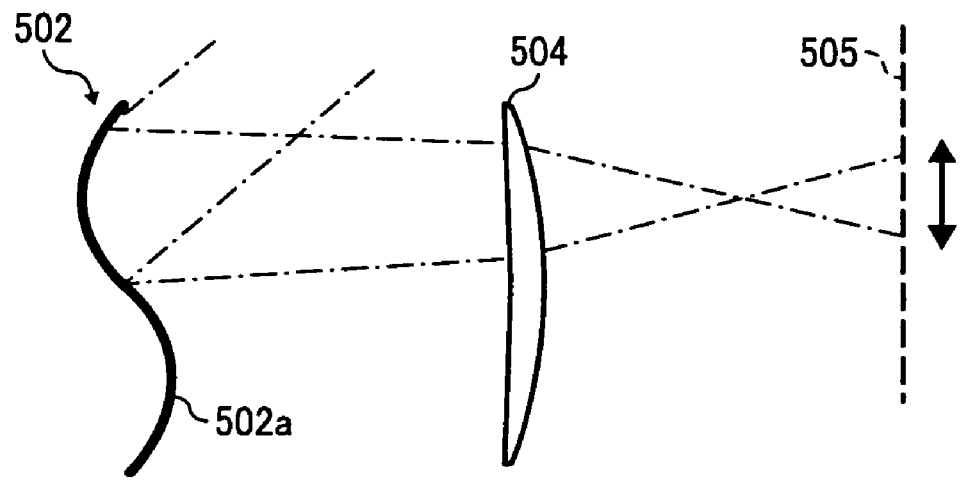
FIG. 56 is a drawing for explaining an example of deflection of a light beam incident to an end of a concave shape of the wavy vibrating mirror depicted in FIG. 55.
Figure 57:
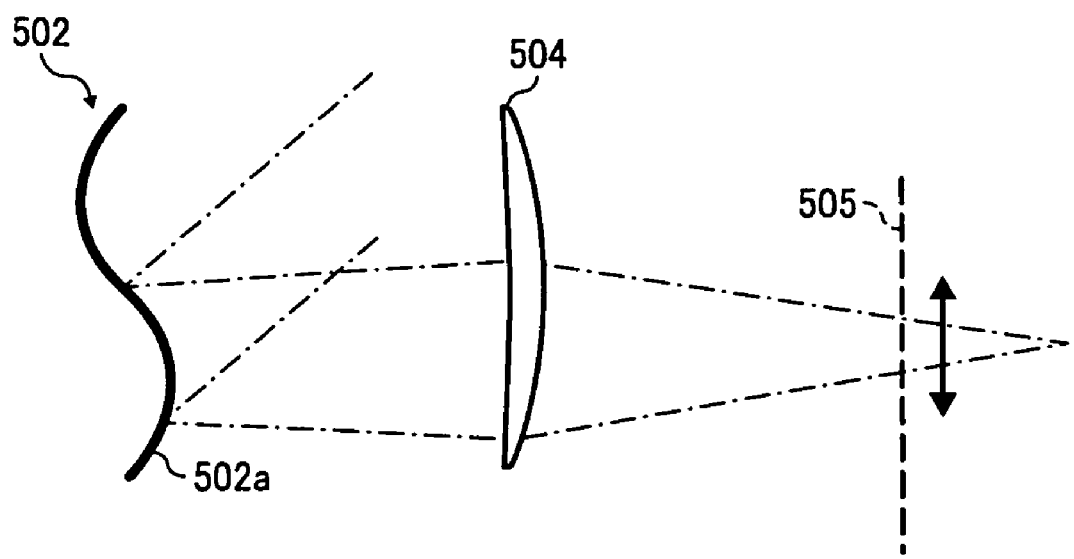
FIG. 57 is a drawing for explaining an example of deflection of a light beam incident to an area of a convex shape of the wavy vibrating mirror depicted in FIG. 55.

FIG. 53 is a configuration diagram of an embodiment of an image forming apparatus having incorporated therein the light-source device and the optical scanning device of the embodiment explained above, according to the present embodiment.

In FIG. 53, around each of a plurality of photosensitive members 6130, an charging unit 6131 that charges the photosensitive member 6130 to a high voltage, a developing roller 6133 that attaches charged toner onto an electrostatic latent image recorded by an optical scanning device 6132 for visualization, a toner cartridge 6134 that supply toner to the developing roller 6133, and a clearing case 6135 that scrapes residual toner on the photosensitive member 6130 for collection are disposed. To each of the photosensitive members 6130, image recording is performed for every two lines in one period through reciprocating scanning of the vibrating mirror body 612 according to the embodiment explained above.

The image forming stations are disposed in line in a moving direction of a transfer belt 6136. Toner images of yellow, magenta, cyan, and black are sequentially transferred onto the transfer belt 6136 with matched timing and superposed each other, thereby forming a color image. Each image forming station is basically identical in configuration, but is different only in toner color.

On the other hand, a recording sheet P is supplied from a paper-feeding tray 6137 to a paper-feeding roller 6138, and is sent out by pair of register rollers 6139 with the timing of the start of recording in the sub-scanning direction. A toner image is transferred from the transfer belt 6136, is subjected to a fixing process at a fixing unit 6140, and is then delivered by a paper-delivery roller 6141 to a paper-delivery tray 6142.

As an optical scanning scheme for image formation onto each photosensitive members 6130, forward scanning or return scanning, that is, one-way scanning is possible for image formation, and also reciprocating scanning is possible for image formation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a light-source unit that emits a light beam;
   a line-imaging lens that condenses the light beam from the light-source unit in one direction to form a line image;
   an optical deflecting unit that deflects the light beam passing through the line-imaging lens;
   an imaging optical unit that images the light beam deflected by the optical deflecting unit in a spot shape on a scanning surface to be scanned; and
   an adjusting unit that adjusts a position of irradiation of the light beam from the light-source unit on the optical deflecting unit so that the position of irradiation of the light beam from the light-source unit is guided to substantially a center of the optical deflecting unit in the main scanning direction.

2. The optical scanning device according to claim 1, wherein the adjusting unit adjusts an orientation of the light beam in a main scanning direction of the optical deflecting unit.

3. The optical scanning device according to claim 1, wherein the adjusting unit adjusts the position of irradiation of the light beam in a main scanning direction of the optical deflecting unit.

4. The optical scanning device according to claim 1, wherein the adjusting unit adjusts a position and an inclination of the light deflecting unit in a main scanning direction of the optical deflecting unit.

5. The optical scanning device according to claim 1, wherein the adjusting unit is arranged between the light-source unit and the optical deflecting unit, and the adjusting unit includes a diaphragm unit including an opening that regulates a flux width of the light beam from the light-source unit.

6. The optical scanning device according to claim 5, further comprising a diaphragm-unit adjusting unit that adjusts a position and an inclination of the diaphragm unit in a main scanning direction of the optical deflecting unit.

7. The optical scanning device according to claim 5, wherein the diaphragm unit is arranged near the optical deflecting unit between the light-source unit and the optical deflecting unit.

8. The optical scanning device according to claim 5, wherein the diaphragm unit is arranged between the line-imaging lens and the optical deflecting unit.

9. The optical scanning device according to claim 5, wherein a size of the opening is larger than a width of the optical deflecting unit in a main scanning direction of the optical deflecting unit.

10. The optical scanning device according to claim 1, wherein the optical deflecting unit includes a vibrating mirror including a frame body, a torsional bar with one end connected to an inner edge of the frame body, and a deflecting plane connected to other end of the torsional bar, the deflecting plane being capable of deflecting the light beam from the light-source unit and rotating around the torsional bar.

11. An image forming apparatus comprising:
   a photosensitive member on which an electrostatic latent image is formed;
   a charging device that charges a surface of the photosensitive member;
   a developing device that develops the electrostatic latent image formed on the photosensitive member to form a toner image on the photosensitive member; and
   the optical scanning device according to claim 1.

12. A light-source device comprising:
- a light-source unit that emits a light beam;
- a lens that condenses the light beam from the light-source unit in a predetermined condensing state;
- a holding member that integrally holds the light-source unit and the lens;
- a light-source supporting member abutting on a plane orthogonal to an optical axis of the light-source unit at the holding member and supporting the holding member; and
- a light-source angle adjusting member that adjusts an angle of the plane.

13. An optical scanning device comprising:
- a light-source unit that emits a light beam;
- an optical deflecting unit that is supported by a torsional bar, and deflects the light beam from the light-source unit to scan a main scanning area in a reciprocating manner;
- an imaging optical unit that images the light beam scanned by the optical deflecting unit in a spot shape on a scanning surface to be scanned; and
- a beam-incident-position adjusting unit that adjusts an incident position of the optical beam with respect to the optical deflecting unit in such a manner that spot sizes of the optical beams at respective ends of the main scanning area substantially coincide with each other.

14. The optical scanning device according to claim 13, further comprising an optical-deflecting-unit driving unit that detects the light beam scanned by the optical deflecting unit, and controls an amplitude of the optical deflecting unit so that a scanning time for the main scanning area becomes constant.

15. The optical scanning device according to claim 13, wherein the light-source unit is provided at a position where $\theta_0 > \alpha/2 > \theta_d$ is satisfied, where $\theta_0$ is the amplitude of the optical deflecting unit, $\theta_d$ is a deflection angle of the optical deflecting unit corresponding to each end of the main scanning area, and $\alpha$ is an angle formed by an optical axis of the light beam incident from the light-source unit onto the optical deflecting unit and an optical axis of the imaging optical unit.

16. The optical scanning device according to claim 15, wherein the light-source unit is provided at a position where the deflection angle $\theta_d$ of the optical deflecting unit corresponding to each end of the main scanning area satisfies $\theta_d/\theta_0 \leq 0.6$.

17. The optical scanning device according to claim 13, wherein a plurality of the light-source units are provided, and the optical deflecting unit is a single unit, and scans a plurality of main scanning areas corresponding to respective light beams from the light-source units.

18. The optical scanning device according to claim 13, wherein the light-source unit modulates the light beam according to image information in either one of directions in the scanning in the reciprocating manner.

19. An image forming apparatus comprising:
- the optical scanning device according to claim 14;
- an electrostatic-image forming unit that modulates the light beam from the light source according to image information to form an electrostatic image on a photosensitive member; and
- an image forming unit that develops the electrostatic image with toner to form a toner image, and transfers the toner image onto a recording medium to form an image on the recording medium,
- wherein the optical-deflecting-unit driving unit drives the optical deflecting unit with a predetermined scanning frequency.

* * * * *